US010171256B2

(12) United States Patent
Faulkner et al.

(10) Patent No.: US 10,171,256 B2
(45) Date of Patent: Jan. 1, 2019

(54) INTERACTIVE TIMELINE FOR A TELECONFERENCE SESSION

(71) Applicant: Microsoft Technology Licensing, LLC, Redmond, WA (US)

(72) Inventors: Jason Thomas Faulkner, Seattle, WA (US); Jose Rodriguez, Seattle, WA (US); Casey Baker, Seattle, WA (US); Sonu Arora, Kirkland, WA (US); Christopher Welsh, Tacoma, WA (US); Kevin D. Morrison, Arlington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 122 days.

(21) Appl. No.: 15/427,007

(22) Filed: Feb. 7, 2017

(65) Prior Publication Data

US 2018/0227138 A1 Aug. 9, 2018

(51) Int. Cl.
*H04L 29/06* (2006.01)
*H04L 12/18* (2006.01)
*H04L 29/08* (2006.01)

(52) U.S. Cl.
CPC ...... *H04L 12/1818* (2013.01); *H04L 12/1822* (2013.01); *H04L 12/1827* (2013.01); *H04L 12/1831* (2013.01); *H04L 12/1813* (2013.01)

(58) Field of Classification Search
USPC ................................................ 709/201–204
See application file for complete search history.

(56) References Cited

U.S. PATENT DOCUMENTS

| | | |
|---|---|---|
| 6,119,147 A | 9/2000 | Toomey et al. |
| 8,209,181 B2 | 6/2012 | Heckerman et al. |
| 8,310,521 B2 | 11/2012 | Zhang et al. |
| 8,631,326 B2 | 1/2014 | Meaney et al. |
| 8,667,401 B1 | 3/2014 | Lozben |

(Continued)

OTHER PUBLICATIONS

"Recording Editor: Editing a Recording (WBS29.13, WBS30)", https://help.webex.com/docs/DOC-1016, Published on: Jan. 26, 2015, 8 pages.

(Continued)

*Primary Examiner* — Jude Jean Gilles
(74) *Attorney, Agent, or Firm* — Scott Y. Shigeta; Newport IP, LLC

(57) ABSTRACT

Described herein is a system that generates and displays an interactive timeline for a teleconference session. The system determines notable events that occur in association with live and/or recorded content of the teleconference session. The system adds a representation of a notable event to the interactive timeline in association with a time at which the notable event occurs. Moreover, the system enables varying levels of user interaction with a representation so that the user can view different amounts of information associated with a notable event. For example, first input associated with a representation can cause first information about a notable event to be displayed to a user without interrupting a current view of content being displayed. In an event the user wants to view more detailed information about the notable event, the user can provide second input which causes second information about the notable event to be displayed.

20 Claims, 18 Drawing Sheets

(56) References Cited

U.S. PATENT DOCUMENTS

| | | | |
|---|---|---|---|
| 8,713,106 B2 | 4/2014 | Spataro et al. | |
| 8,745,497 B2 | 6/2014 | Hintermeister et al. | |
| 8,750,678 B2 | 6/2014 | Li et al. | |
| 8,887,067 B2 | 11/2014 | Tripathi et al. | |
| 9,055,192 B1 | 6/2015 | Mallappa et al. | |
| 9,332,227 B2 | 5/2016 | Cunico et al. | |
| 9,661,272 B1* | 5/2017 | Daniel | H04N 7/15 |
| 10,070,093 B1 | 9/2018 | Faulkner | |
| 2002/0194595 A1* | 12/2002 | Miller | H04H 20/10 725/36 |
| 2003/0220973 A1 | 11/2003 | Zhu et al. | |
| 2004/0143630 A1 | 7/2004 | Kaufmann et al. | |
| 2004/0172588 A1 | 9/2004 | Mattaway | |
| 2005/0144284 A1 | 6/2005 | Ludwig et al. | |
| 2005/0256735 A1* | 11/2005 | Bayne | G06Q 10/06 705/7.38 |
| 2007/0174774 A1 | 7/2007 | Lerman et al. | |
| 2008/0137558 A1 | 6/2008 | Baird | |
| 2009/0089683 A1 | 4/2009 | Thapa | |
| 2009/0119246 A1 | 5/2009 | Kansal | |
| 2009/0249223 A1 | 10/2009 | Barsook et al. | |
| 2009/0327425 A1 | 12/2009 | Gudipaty | |
| 2010/0037151 A1 | 2/2010 | Ackerman et al. | |
| 2010/0223345 A1 | 9/2010 | Gupta et al. | |
| 2010/0299616 A1* | 11/2010 | Chen | G06Q 10/10 715/753 |
| 2010/0306018 A1 | 12/2010 | Burtner et al. | |
| 2011/0072037 A1 | 3/2011 | Lotzer | |
| 2011/0161834 A1 | 6/2011 | Shadfar et al. | |
| 2011/0267419 A1 | 11/2011 | Quinn | |
| 2012/0086680 A1 | 4/2012 | Ueda | |
| 2012/0117130 A1* | 5/2012 | Gearhart | G06F 17/30023 707/827 |
| 2012/0117659 A1* | 5/2012 | Gearhart | G06F 21/10 726/27 |
| 2012/0124485 A1* | 5/2012 | Scherpa | G06Q 10/10 715/753 |
| 2012/0150577 A1 | 6/2012 | Berg et al. | |
| 2012/0151320 A1 | 6/2012 | Mcclements, IV | |
| 2012/0296914 A1 | 11/2012 | Romanov | |
| 2012/0321062 A1 | 12/2012 | Fitzsimmons et al. | |
| 2013/0125000 A1 | 5/2013 | Fleischhauer et al. | |
| 2013/0205326 A1 | 8/2013 | Sinha et al. | |
| 2013/0339431 A1 | 12/2013 | Yannakopoulos et al. | |
| 2014/0029919 A1 | 1/2014 | Codavalli et al. | |
| 2014/0161244 A1 | 6/2014 | Jones et al. | |
| 2014/0198173 A1 | 7/2014 | Willig | |
| 2014/0214961 A1 | 7/2014 | Douglas | |
| 2014/0219433 A1 | 8/2014 | Pai et al. | |
| 2014/0222840 A1 | 8/2014 | Sanaullah et al. | |
| 2014/0245162 A1 | 8/2014 | Deibler et al. | |
| 2014/0278405 A1 | 9/2014 | Peters et al. | |
| 2014/0317532 A1 | 10/2014 | Ma et al. | |
| 2015/0237082 A1* | 8/2015 | Duong | G06F 17/30887 715/753 |
| 2015/0237084 A1* | 8/2015 | Duong | G06F 17/30887 715/753 |
| 2015/0264315 A1 | 9/2015 | Kitazawa | |
| 2016/0072862 A1 | 3/2016 | Bader-natal et al. | |
| 2016/0182851 A1 | 6/2016 | Girgensohn | |
| 2016/0255308 A1 | 9/2016 | Willig et al. | |
| 2018/0227339 A1 | 8/2018 | Rodriguez et al. | |

OTHER PUBLICATIONS

"Recording a Meeting", https://support.office.com/en-us/article/Recording-a-Meeting-5bdbc70f-bb27-4247-a9db-4cfadc4caa55, Published on: Feb. 8, 2016, 3 pages.

"Oracle Beehive Conferencing Desktop Client", https://docs.oracle.com/cd/E16671_01/bh.200/e25458/desktopclientconf.htm, Published on: Oct. 1, 2012, 23 pages.

"Record and play back Adobe Connect meetings", https://helpx.adobe.com/adobe-connect/using/recording-playing-back-meetings.html, Retrieved on: Jan. 2, 2017, 18 pages.

"International Search Report and Written Opinion Issued in PCT Application No. PCT/US2018/018871", dated May 11, 2018, 23 Pages.

U.S. Appl. No. 15/442,422, Non Final Office Action dated Jul. 14, 2017, 9 pages.

U.S. Appl. No. 15/442,422, Final Office Action dated Feb. 7, 2018, 14 pages.

"Notice of Allowance Issued in U.S. Appl. No. 15/426,992", dated Aug. 1, 2018, 09 Pages.

"Non Final Office Action Issued in U.S. Appl. No. 16/046,122", dated Oct. 31, 2018, 13 Pages.

* cited by examiner

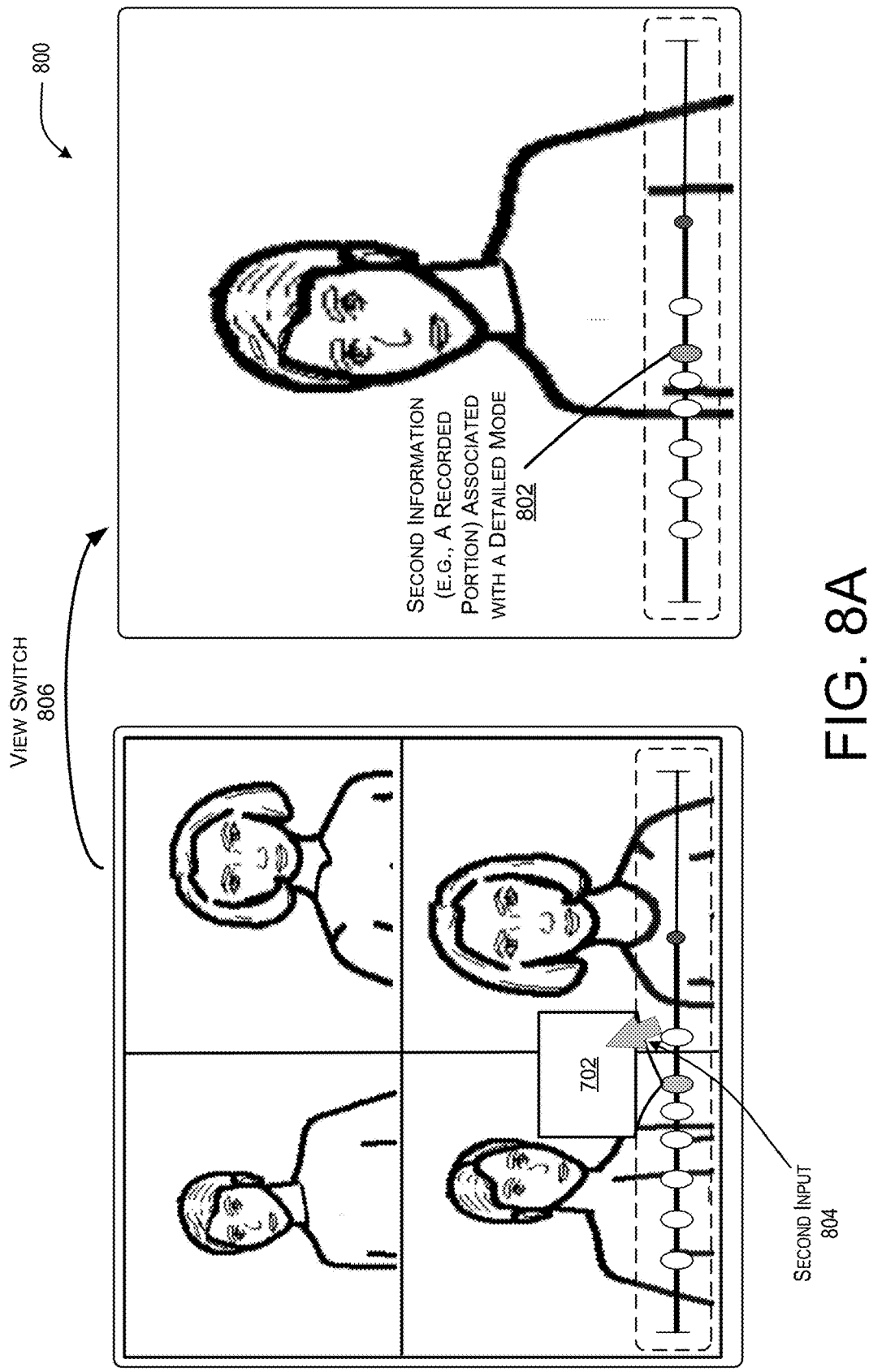

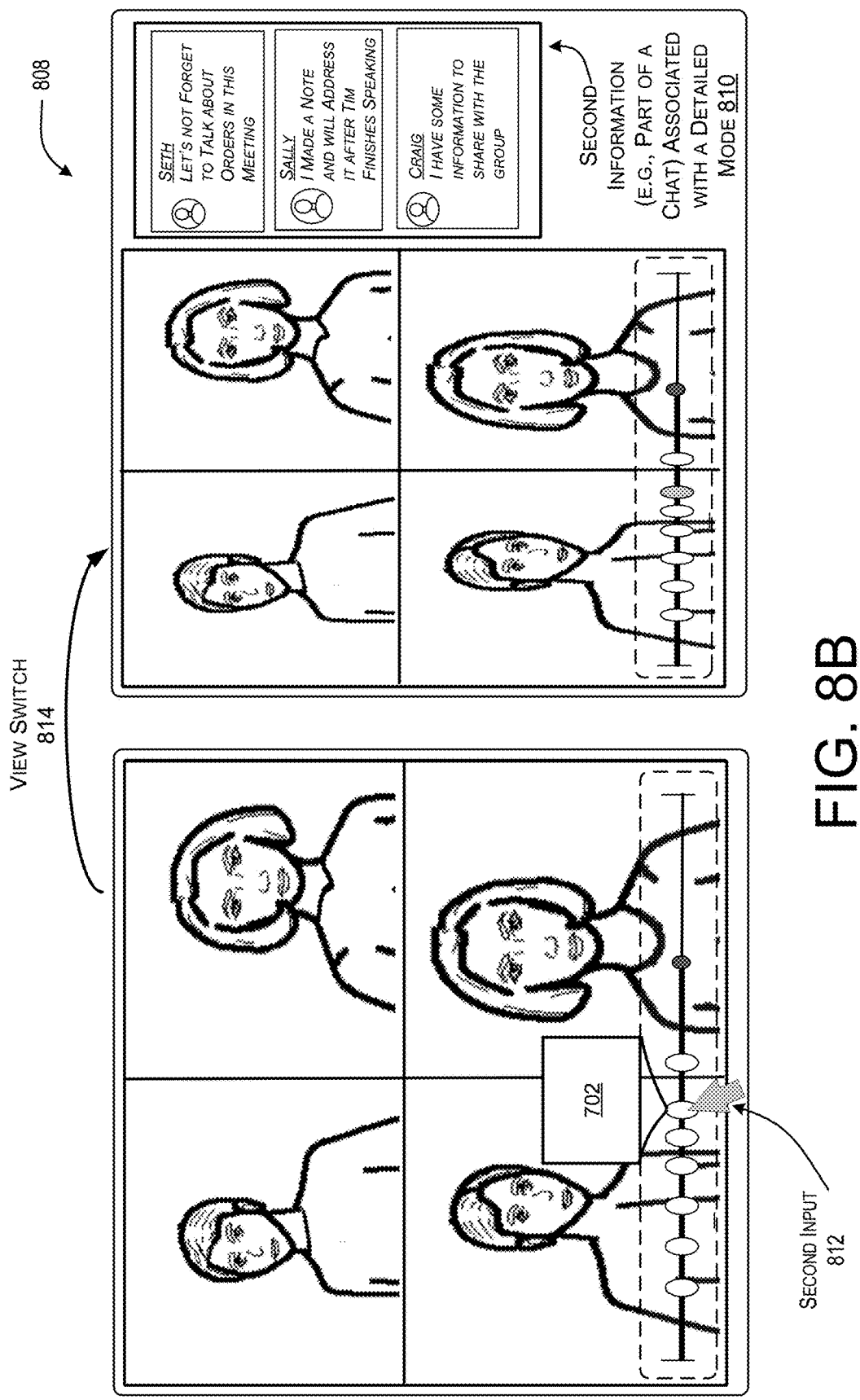

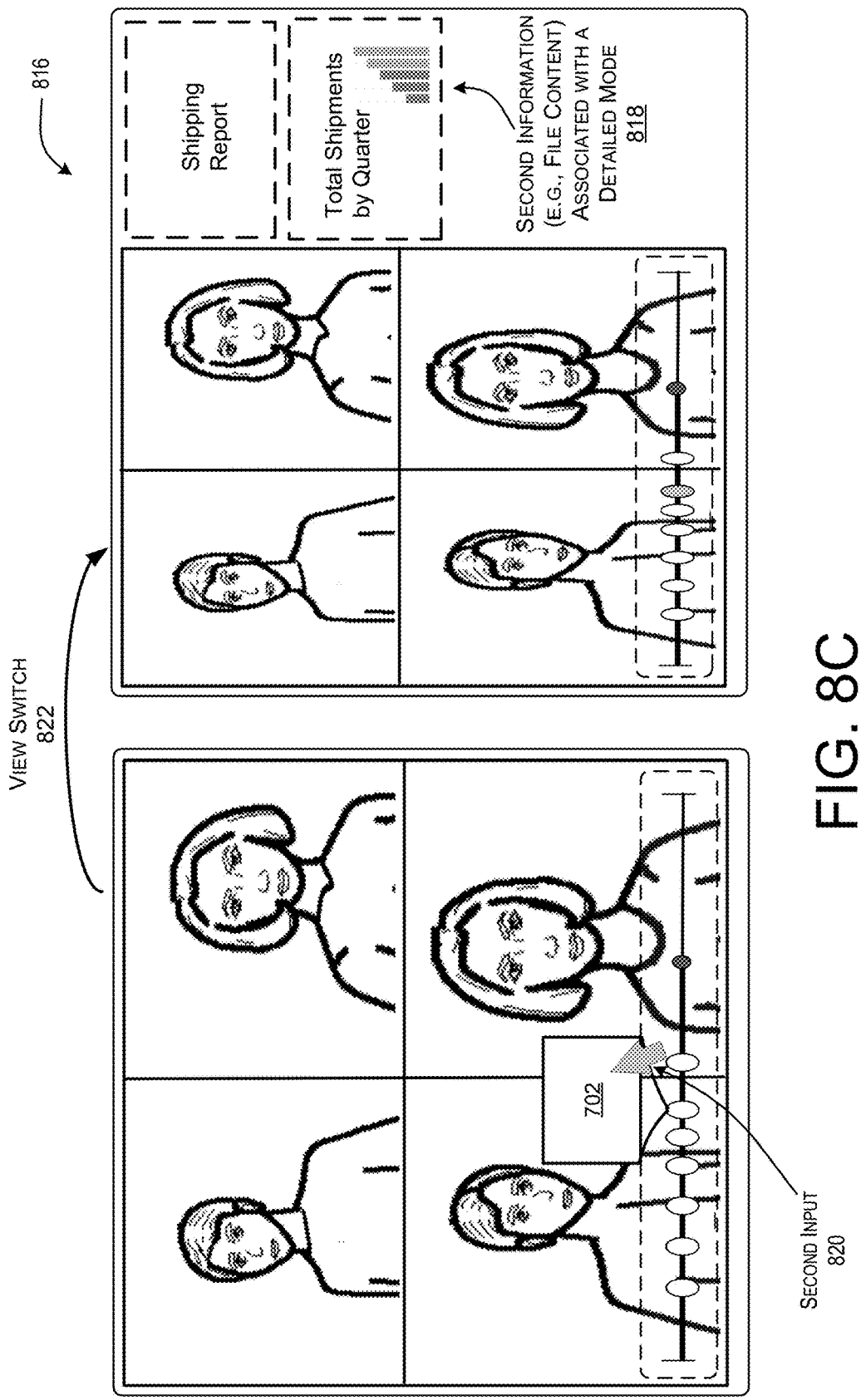

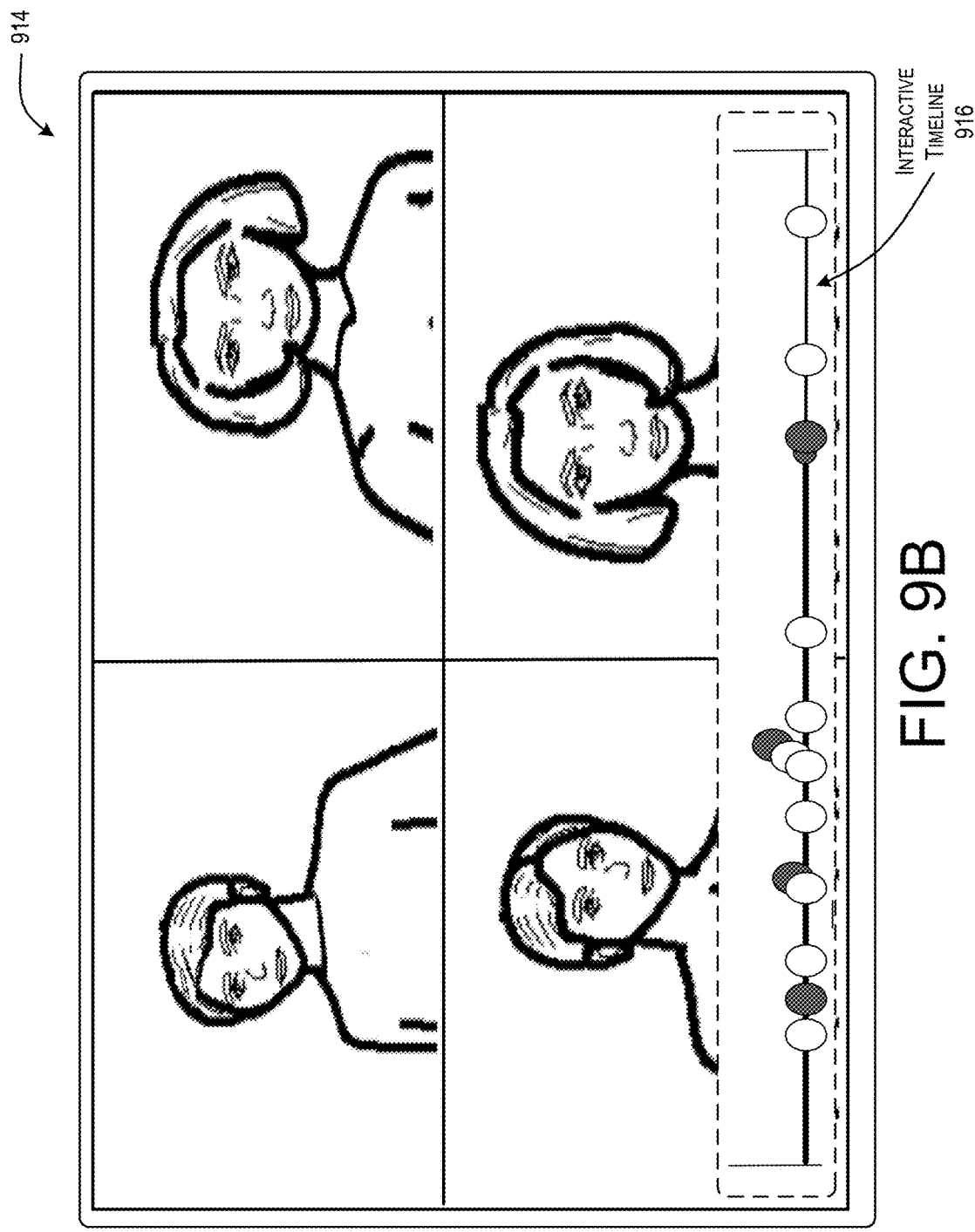

INTERACTIVE TIMELINE FOR A TELECONFERENCE SESSION

BACKGROUND

At present, the use of teleconference (e.g., videoconference) systems in personal and commercial settings has increased dramatically so that meetings between people in remote locations can be facilitated. In general, teleconference systems allow users, in two or more remote locations, to communicate interactively with each other via live, simultaneous two-way video streams, audio streams, or both. Some teleconference systems (e.g., CISCO WEBEX provided by CISCO SYSTEMS, Inc. of San Jose, Calif., GOTO MEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE provided by the MICROSOFT CORPORATION, of Redmond, Wash.) also allow users to exchange files and/or share display screens that present, for example, images, text, video, applications, online locations, social media, and any others.

Teleconference systems enable a user to participate in a teleconference session (e.g., a meeting) via a remote device. In some scenarios, the user may have missed a live viewing of a teleconference session, or may have been late to join the live viewing of teleconference session, due to a scheduling conflict, for example (e.g., a late lunch, another scheduled meeting at the same time, etc.). In additional scenarios, the user may have an interest in gaining awareness and/or recollection of activity that previously occurred in a teleconference session even when the user joined the teleconference session on time. In these types of scenarios, if the user wants to know what previously occurred in the teleconference session, the user typically needs to navigate (e.g., fast forward and/or rewind) a full recording of the teleconference session to try to find the relevant activity that previously occurred. Moreover, in a scenario where the user missed the live viewing of the teleconference session, for example, the user is unable to contribute any activity to the teleconference session.

SUMMARY

The disclosed system addresses the problems described above with regards to a teleconference session. Specifically, the disclosed system is configured to generate and display a timeline that includes representations (e.g., markers, symbols, icons, nodes, thumbnails, etc.) of notable events that are associated with a teleconference session. The timeline can represent an actual and/or a scheduled duration of the teleconference session, and thus, each representation of a notable event on the timeline can be associated with a timestamp, or a time period, based on when the notable event occurs within a duration of the teleconference session. Furthermore, the timeline is interactive (e.g., referred to herein as an "interactive timeline") such that a user is able to interact with individual representations on the timeline to quickly access and view different amounts of information associated with an individual notable event. For instance, the user can initially provide first input associated with a representation to view first information associated with a notable event on the interactive timeline without interrupting a current viewing experience. In one example, the first input can include hover input of a user control element on top of a representation and the first information can comprise general or broad information describing the notable event. Based on viewing the first information, the user may then decide to view second information (e.g., more detailed information) associated with the notable event by providing second input (e.g., a selection or click of the representation). Consequently, the interactive timeline described herein is a tool that provides an improved way for a user to navigate notable events associated with a teleconference session and that enables the user to efficiently gain an awareness of notable events associated with a teleconference session.

In various examples described herein, a notable event that is associated with a teleconference session can occur during a live viewing of the teleconference session (e.g., viewing of live content as the teleconference session is initially being conducted and/or as the teleconference session is being recorded). Consequently, a representation of the notable event can be added to an interactive timeline during the live viewing, and users participating in the live viewing of the teleconference session can view the representation of the notable event that previously occurred as the live content of the teleconference session continues to be displayed. In other examples described herein, a notable event that is associated with a teleconference session can occur during a recorded viewing of a recording of the teleconference session (e.g., viewing of recorded content after the live viewing of the teleconference session has ended). Consequently, a representation of the notable event can also be added to the interactive timeline during the recorded viewing so that users that may have missed the live viewing of the teleconference session can still contribute activity to the teleconference session experience even after the live viewing of the teleconference session has ended. For instance, a team member that lives in a country in Europe may be asleep when the rest of his team located in the United States initially conducts a teleconference session. Upon waking up the next day and starting work, the team member that lives in the country in Europe can participate in the teleconference session by (i) viewing a recording of the teleconference session, (ii) interacting with the interactive timeline that highlights notable events, and/or (iii) adding notable events to the interactive timeline thereby contributing activity to the teleconference session even after the live viewing of the teleconference session has ended. Consequently, additional users that subsequently view the recording of the teleconference session and/or the interactive timeline can see activity that was added after the teleconference session already ended. Stated another way, a recording of a teleconference session and the interactive timeline enables collaboration between users (e.g., team members working on a project) to continue even though the live viewing of the teleconference session has already ended.

As described herein, the system can determine a notable event based on system detection or based on user input. That is, the system can detect a notable event, timestamp the notable event, and automatically add a representation of the notable event to the interactive timeline (e.g., without user input). Alternatively, a representation of a notable event can be specifically added to the interactive timeline by a user (e.g., based on user selection of an option to add a notable event). A notable event includes activity (e.g., one or more actions) in a teleconference session that is considered to be important or relevant to understanding a context of the teleconference session, such that knowledge of the activity via a quick view of a representation on the interactive timeline and/or via interacting with the representation to view additional information about the notable event enables a user to efficiently gain an awareness of what has occurred in the teleconference session. The notable events can be of a variety of different types, and thus, the interactive timeline is configured to present different types of representations that correspond to different types of notable events. The different types of representations presented on the interactive timeline can comprise graphical distinctions (e.g., different symbols, different icons, different colors, different sizes, etc.). Furthermore, the interactive timeline can also or alternatively be configured to graphically distinguish between notable events based on a user that is a source of the notable event (e.g., using different colors). For instance, a "fill" color of a representation can identify a type of notable event while a "border" color that surrounds the fill color of the representation can identify a user that is the source of the notable event. A user is a source of the notable event if the user added a representation of the notable event to the interactive timeline or if the user performed or caused the activity that was detected and represented on the interactive timeline.

In various examples, different types of notable events can include: a specific mention of a user (e.g., an "@mention"), a specific mention of a team, a file or a display screen that is shared (e.g., a document, a presentation, a spreadsheet, a video, a web page, etc.), a comment that is submitted to a chat conversation that is associated with (e.g., is part of) the teleconference session, a task that is assigned, a poll that is conducted, an expression (e.g., an emoji) that is shared, or a link to an external object such as another teleconference session (e.g., a link to a newly scheduled meeting while a current meeting is being conducted). Other types of notable events can include: a user joining the teleconference session, a user leaving the teleconference session, media (e.g., video) injected into a recording of the teleconference session after the teleconference session has ended, an explicit flag added to the interactive timeline by a user to mark an important moment, a time period of concentrated activity, or any other activity determined to provide value or contribute to understanding a context of the teleconference session. In some instances, the types of notable events the system monitors for and detects for a teleconference session can be defined by a user (e.g., a host user of the teleconference session).

As described above, to enhance the user experience, the interactive timeline is configured to display different amounts of information associated with a notable event based on varying levels of user interaction with a representation. The different amounts of information can be associated with different modes. For example, a preview mode enables a user to first view information that generally describes and/or encapsulates a notable event based on first input received in association with a representation, while a detailed mode enables the user to take a deeper dive and view additional and more detailed information about the notable event based on second input received in association with the representation. The different modes enhance the user experience because the different modes enable a user to first view a small amount of information without interrupting the content of the teleconference session that is currently being displayed on a display screen. That is, in association with the preview mode, the content of the teleconference session can continue to be displayed in a current view associated with a position of an interactive timeline cursor (e.g., a time of the teleconference session currently being displayed). While the content continues to be displayed in the current view, the information associated with the preview mode can be displayed in an overlay area (e.g., an overlay pop-up window) on top of the content based on the first input provided by the user. For instance, a user can hover a user control element such as a mouse cursor over a representation and subsequently view the information describing a notable event for a predetermined period of time (e.g., three seconds, five seconds, etc.).

After viewing the information associated with the preview mode without interrupting the content of the teleconference session currently being displayed, the user can decide whether to view additional information about the notable event in the detailed mode. Accordingly, second input can be provided and/or received, the second input being associated with a request to view the additional information in the detailed mode. Based on receiving the second input, the system is configured to switch the display from the current view to a different view to accommodate the display of the additional information associated with the notable event. As described herein, this switch from one view to another view may provide a minor interruption to the content of the teleconference session currently displayed due to a change in content layout.

In various examples, the information displayed in association with the preview mode provides an overview of a notable event and is presented in a smaller display area so that the current viewing experience of the user is not interrupted, or an amount of visual interference is limited. For instance, the information can include one or more of: identification information (e.g., name, avatar, alias, etc.) associated with a user that is a source of the notable event, identification information associated with one or more users to which the notable event is directed, text of an individual comment that is submitted to a chat conversation associated with the teleconference session, a name of a file that is shared, a general description of a task that is assigned, an option to submit a vote for a poll that is conducted, or a link to an external object.

In various examples, the information displayed in association with the detailed mode comprises more specific information that provides a deeper set of details about the notable event or a context of the notable event. This information is typically presented in association with a view switch so the information can be presented in a larger display area to attract user focus since the user has indicated an interest in viewing additional information about the notable event beyond that provided in the preview mode. For instance, the information can include one or more of: a recorded portion of the teleconference session associated with a time on the interactive timeline with which the notable event is associated, a part of a chat conversation in which a comment is submitted (e.g., other comments that surround an individual comment), a display area of a recorded portion of the teleconference session associated with a time on the interactive timeline with which the notable event is associated, content of a file that is shared (e.g., a document page, a slide of a presentation, etc.), details of a task that is assigned (e.g., step-by-step instructions), results of a poll that is conducted, or information accessible via selection of a link to an external object.

In various examples, the interactive timeline can be linked to a chat conversation that is associated with (e.g., part of) a teleconference session. That is, the system can detect an occurrence of a notable event in the chat conversation, and can add a corresponding representation to the interactive timeline based on the detection. This enables users to submit comments, replies to comments, files, expressions (e.g., emojis), links to external objects (e.g., a URL), etc. to the chat conversation while viewing live or recorded content of a teleconference session and those comments, replies to comments, files, expressions, links to external objects, etc.

can be timestamped and added to the interactive timeline at a point where the interactive timeline cursor is currently located. Consequently, viewers of live or recorded content of a teleconference session can collaboratively contribute notable events to the interactive timeline using the chat conversation.

In various examples, the interactive timeline is configured to graphically distinguish between representations that are added during a live viewing of a teleconference session and representations that are added during a recorded viewing of the teleconference session. In this way, a viewer can quickly understand notable events that occurred during the live viewing of the teleconference session and notable events that were added after the live viewing of the teleconference session has ended. In one example, the graphical distinction can be based on display location on a display screen. For instance, a first set of representations can be displayed in a first visual layer on the interactive timeline while a second set of representations can be displayed in a second visual layer on the interactive timeline, where the layers are offset by height on a display screen. In another example, the graphical distinction can be based on display color. For instance, a first set of representations can be displayed in a first color on the interactive timeline while a second set of representations can be displayed in a second color on the interactive timeline.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8A illustrates an example graphical user interface configured to display second information associated with a notable event based on second input associated with a representation on the interactive timeline, the second information being displayed in association with a view switch.

FIG. 8B illustrates another example graphical user interface configured to display second information associated with a notable event based on second input associated with a representation on the interactive timeline, the second information being displayed in association with a view switch.

FIG. 8C illustrates yet another example graphical user interface configured to display second information associated with a notable event based on second input associated with a representation on the interactive timeline, the second information being displayed in association with a view switch.

FIG. 9B illustrates another example graphical user interface configured to distinguish, in association with an interactive timeline, between a first set of representations corresponding to a first set of notable events that occur during a live viewing of the teleconference session and a second set of representations corresponding to a second set of notable events that occur during a recorded viewing of the teleconference session.

DETAILED DESCRIPTION

Examples described herein enable a system to generate and display an interactive timeline for a teleconference session. The system is configured to determine notable events that occur in association with live content and/or recorded content of the teleconference session. The system is configured to add a representation of a notable event to the interactive timeline in association with a time at which the notable event occurs. For instance, a time at which the notable event occurs can be established based on a current position of an interactive timeline cursor. Moreover, the system is configured to enable varying levels of user interaction with a representation so that the user can view different amounts of information associated with a notable event. For example, first input such as hover input associated with a representation can cause first information about a notable event to be displayed to a user in a preview mode without interrupting a current view of content being displayed. In an event the user wants to view additional and more detailed information about the notable event after consuming the first information, the user can provide second input such as a selection (e.g., a click) of the representation or of the first information which can cause second information about the notable event to be displayed in a detailed mode.

Various examples, implementations, scenarios, and aspects are described below with reference to FIGS. 1 through 12.

Figure 1:
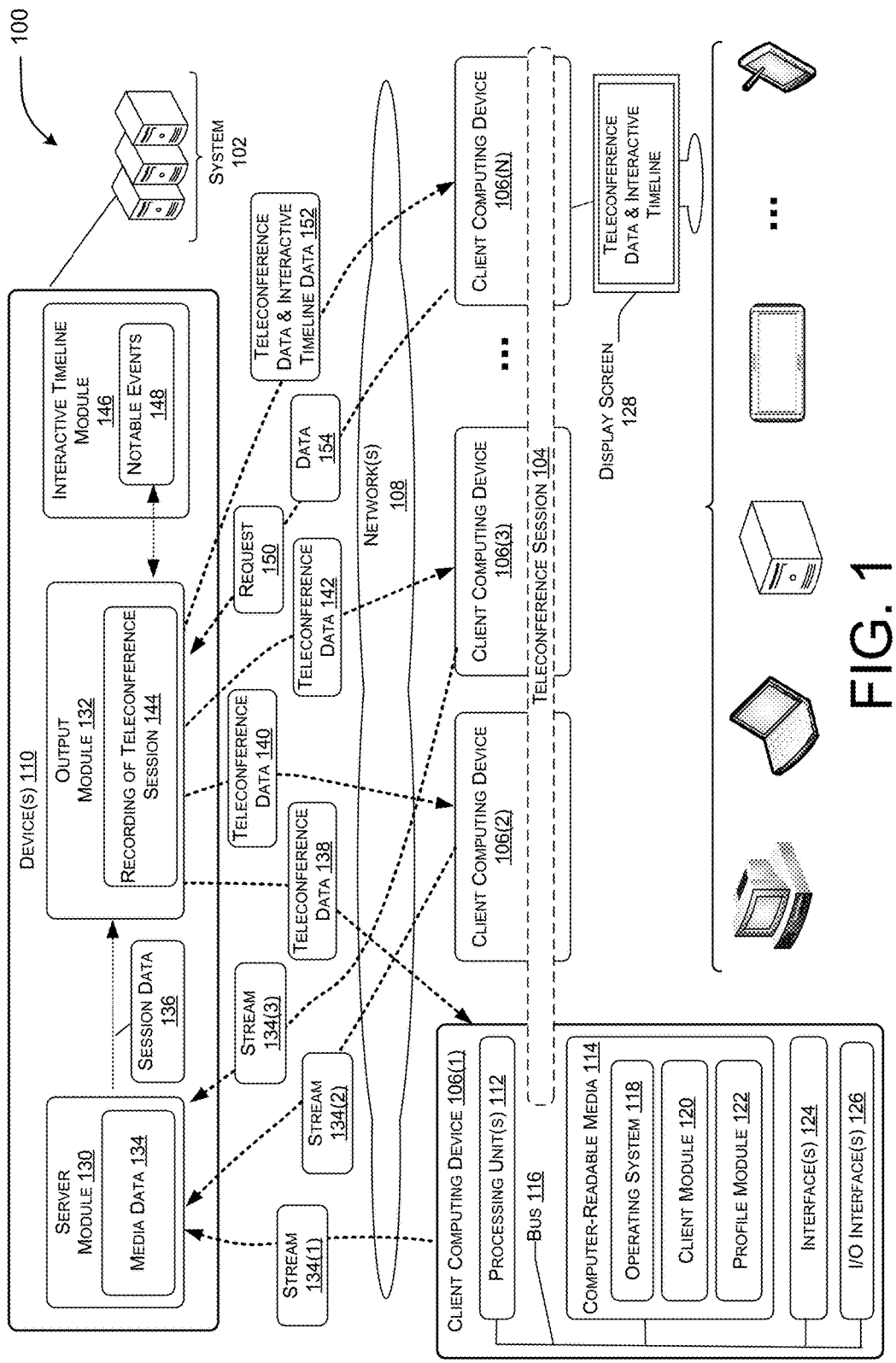
FIG. 1 is a diagram illustrating an example environment in which a system can generate an interactive timeline to be displayed on a client computing device.

FIG. 1 is a diagram illustrating an example environment 100 in which a system 102 can operate to generate and display an interactive timeline for a teleconference session 104. In this example, the teleconference session 104 is implemented between a number of client computing devices 106(1) through 106(N) (where N is a positive integer number having a value of two or greater). The client computing devices 106(1) through 106(N) enable users to participate in the teleconference session 104. In this example, the teleconference session 104 is hosted, over one or more network(s) 108, by the system 102. That is, the system 102 can provide a service that enables users of the client computing devices 106(1) through 106(N) to participate in the teleconference session 104 (e.g., via a live viewing and/or a recorded viewing). Consequently, a "participant" to the teleconference session 104 can comprise a user and/or a client computing device (e.g., multiple users may be in a conference room participating in a teleference session via the use of a single client computing device), each of which can communicate with other participants. As an alternative, the teleconference session 104 can be hosted by one of the client computing devices 106(1) through 106(N) utilizing peer-to-peer technologies.

In examples described herein, client computing devices 106(1) through 106(N) participating in a teleconference session 104 are configured to receive and render for display, on a user interface of a display screen, teleconference data. The teleconference data can comprise a collection of various instances, or streams, of content. For example, an individual stream of content can comprise media data associated with a video feed (e.g., audio and visual data that capture the appearance and speech of a user participating in the teleconference session). Another example of an individual stream of content can comprise media data that includes an avatar of a user participating in the teleconference session along with audio data that captures the speech of the user. Yet another example of an individual stream of content can comprise media data that includes a file displayed on a display screen along with audio data that captures the speech of a user. Accordingly, the various streams of content within the teleconference data enable a remote meeting to be facilitated between a group of people and the sharing of content within the group of people.

The system 102 includes device(s) 110. The device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more teleconference sessions such as teleconference session 104. As an example, the system 102 may be managed by entities such as SLACK, WEBEX, GOTOMEETING, GOOGLE HANGOUTS, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by processing units(s) 112.

Client computing device(s) 106(1) through 106(N) may also include one or more interface(s) 124 to enable communications between client computing device(s) 106(1) through 106(N) and other networked devices, such as device(s) 110, over network(s) 108. Such network interface(s) 124 may include one or more network interface controllers (NICs) or other types of transceiver devices to send and receive communications and/or data over a network. Moreover, a client computing device 106(1) can include input/output ("I/O") interfaces 126 that enable communications with input/output devices such as user input devices including peripheral input devices (e.g., a game controller, a keyboard, a mouse, a pen, a voice input device such as a microphone, a touch input device, a gestural input device, and the like) and/or output devices including peripheral output devices (e.g., a display, a printer, audio speakers, a haptic output device, and the like). FIG. 1 illustrates that client computing device 106(N) is in some way connected to a display device (e.g., a display screen 128), which can display the interactive timeline for the teleconference session 104, as shown.

In the example environment 100 of FIG. 1, client computing devices 106(1) through 106(N) may use their respective client modules 120 to connect with one another and/or other external device(s) in order to participate in the teleconference session 104. For instance, a first user may utilize a client computing device 106(1) to communicate with a second user of another client computing device 106(2). When executing client modules 120, the users may share data, which may cause the client computing device 106(1) to connect to the system 102 and/or the other client computing devices 106(2) through 106(N) over the network(s) 108.

The client computing device(s) 106(1) through 106(N) may use their respective profile module 122 to generate participant profiles, and provide the participant profiles to other client computing devices and/or to the device(s) 110 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for teleconference sessions.

As shown in FIG. 1, the device(s) 110 of the system 102 includes a server module 130 and an output module 132. The server module 130 is configured to receive, from individual client computing devices such as client computing devices 106(1) through 106(3), media streams 134(1) through 134(3). As described above, media streams can comprise a video feed (e.g., audio and visual data associated with a user), audio data which is to be output with a presentation of an avatar of a user (e.g., an audio only experience in which live video data of the user is not transmitted), text data (e.g., text messages), file data and/or screen sharing data (e.g., a document, a slide deck, an image, a video displayed on a display screen, etc.), and so forth. Thus, the server module 130 is configured to receive a collection of various media streams 134(1) through 134(3) (the collection being referred to herein as media data 134). In some scenarios, not all the client computing devices that participate in the teleconference session 104 provide a media stream. For example, a client computing device may only be a consuming, or a "listening", device such that it only receives content associated with the teleconference session 104 but does not provide any content to the teleconference session 104.

The server module 130 is configured to generate session data 136 based on the media data 134. In various examples, the server module 130 can select aspects of the media data 134 that are to be shared with the participating client computing devices 106(1) through 106(N). Consequently, the server module 130 is configured to pass the session data 136 to the output module 132 and the output module 132 may communicate teleconference data to the client computing devices 106(1) through 106(3). As shown, the output module 132 transmits teleconference data 138 to client computing device 106(1), transmits teleconference data 140 to client computing device 106(2), and transmits teleconference data 142 to client computing device 106(3). The teleconference data transmitted to the client computing devices can be the same or can be different (e.g., positioning of streams of content within a user interface may vary from one device to the next). The output module 132 is also configured to record the teleconference session (e.g., a version of the teleconference data) and to maintain a recording of the teleconference session 144.

The device(s) 110 can also include an interactive timeline module 146, and in various examples, the interactive timeline module 146 is configured to determine notable events 148 in the session data 136 and/or notable events added to the recording of the teleconference session 144. For instance, a notable event 148 can occur as the teleconference session 104 is initially being conducted and/or recorded such that activity that amounts to notable events by users of client computing devices 106(1) through 106(3) that are participating via a live viewing can be determined and added to an interactive timeline by the interactive timeline module 146. A notable event 148 can also occur in association with a recorded viewing of the recording of the teleconference session 144.

For example, client computing device 106(N) can provide a request 150 to view a recording of the teleconference session 104. In response, the output module 132 can provide teleconference data and an interactive timeline data 152 to be displayed on a display screen 128 associated with the client computing device 106(N). Subsequently, the client computing device 106(N) can provide data 154 that represent user interaction (e.g., input(s)) with a representation on the interactive timeline. Based on the data 154, the output module 132 can cause different amount of information about a notable event to be displayed and/or can change a view of content.

FIG. 1 illustrates an example where the interactive timeline is displayed in association with a request 150 to view a recording of the teleconference session 144 (e.g., after the live viewing of the teleconference session). However, the interactive timeline can also be displayed via client computing devices 106(1) through 106(3) in association with a live viewing of the teleconference session 104. Thus, client computing devices 106(1) through 106(3) can also provide data 154 (e.g., based on user input(s)) that represent user interaction with a representation on the interactive timeline.

Figure 2:
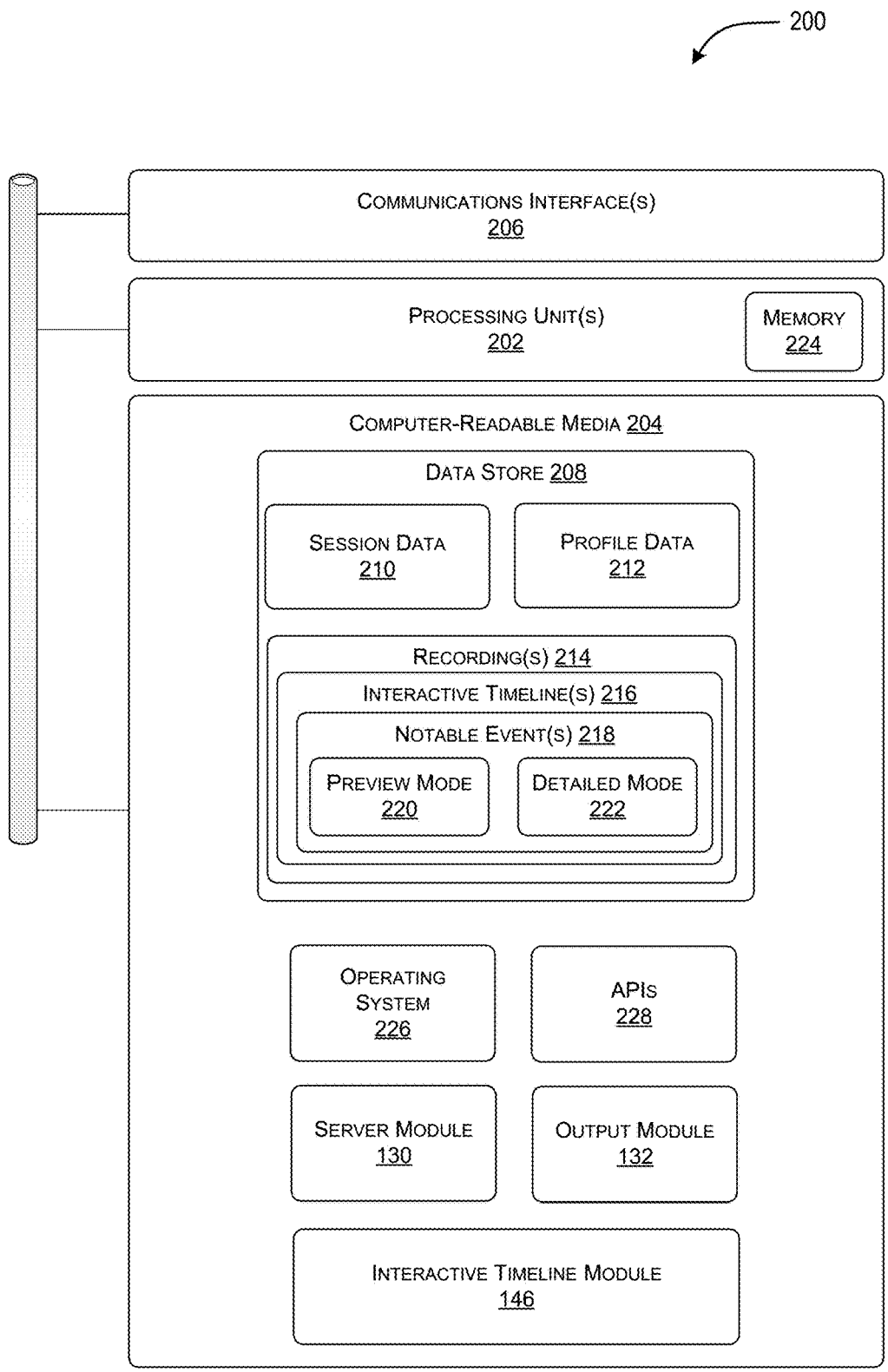
FIG. 2 is a diagram illustrating example components of an example device configured to generate an interactive timeline to be displayed on a client computing device.

FIG. 2 illustrates a diagram that shows example components of an example device 200 configured to generate an interactive timeline for a teleconference session 104 that is to be output via a client computing device 106(N). The device 200 may represent one of device(s) 110, or in other examples a client computing device (e.g., client computing device 106(1)), where the device 200 includes one or more processing unit(s) 202, computer-readable media 204, and communication interface(s) 206. The components of the device 200 are operatively connected, for example, via a bus, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes a data store 208. In some examples, data store 208 includes data storage such as a database, data warehouse, or other type of structured or unstructured data storage. In some examples, data store 208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 208 may store data for the operations of processes, applications, components, and/or modules stored in computer-readable media 204 and/or executed by processing unit(s) 202 and/or accelerator(s). For instance, in some examples, data store 208 may store session data 210 (e.g., session data 136), profile data 212 (e.g., associated with a participant profile), and/or other data. The session data 210 can include a total number of participants (e.g., users and/or client computing devices) in the teleconference session 104, and activity that occurs in the teleconference session 104, and/or other data related to when and how the teleconference session 104 is conducted or hosted. The data store 208 can also include recording(s) 214 of teleconference session(s), and interactive timeline(s) 216 that include representations of notable event(s) 218 that occur in association with the teleconference session(s). Moreover, a notable event 218 can comprise first information to be displayed in association with a preview mode 220 and second information to be displayed in association with a detailed mode 222.

Alternately, some or all of the above-referenced data can be stored on separate memories 224 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes operating system 226 and application programming interface(s) 228 configured to expose the functionality and the data of the device 200 to other devices. Additionally, the computer-readable media 204 includes one or more modules such as the server module 130, the output module 132, and the interactive timeline module 146, although the number of illustrated modules is just an example, and the number may vary higher or lower. That is, functionality described herein in association with the illustrated modules may be performed by a fewer number of modules or a larger number of modules on one device or spread across multiple devices.

Figure 3:
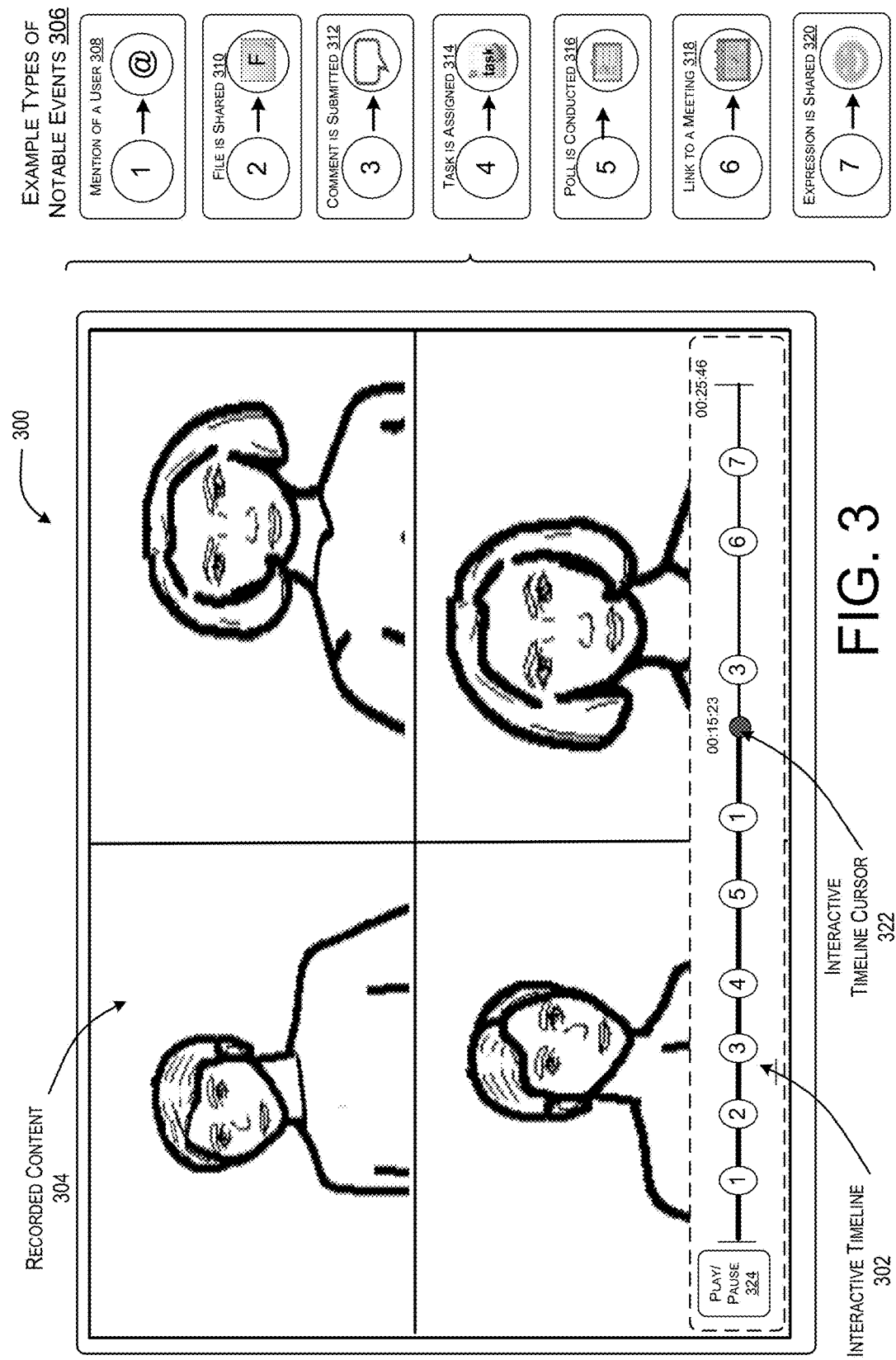
FIG. 3 illustrates an example graphical user interface configured to display an interactive timeline in association with recorded content and to enable a user to interact with representations on the interactive timeline while viewing the recorded content, the representations corresponding to notable events of differing types.

FIG. 3 illustrates an example graphical user interface 300 configured to display an interactive timeline 302 in association with recorded content 304. As described above, the interactive timeline module 146 is configured to determine when notable events 148 occur in association with a teleconference session 104 and generate the interactive timeline 302 to include representations of the notable events 148 (e.g., populate the interactive timeline with representations). That is, the interactive timeline module 146 can analyze session data to detect when a notable event occurs (e.g., a user says a name, a user submits a comment to a chat conversation, etc.) or to identify when a user has specifically added a representation of a notable event to the interactive timeline 302 (e.g., via selection of an option to add a notable event to the interactive timeline 302). In the example of FIG. 3, the interactive timeline 302 is displayed at the bottom of the user interface 300 that is presented on a display screen (e.g., display screen 128), and a display area that includes the interactive timeline 302 is adjacent to the recorded content and is not transparent.

The interactive timeline 302 includes different representations (e.g., the circles, squares, or other shapes on the interactive timeline 302) that correspond to different types of notable events 306. For example, representations of a first type (e.g., representations on the interactive timeline 302 with the number "1" therein) correspond to occurrences of a type of notable event in which a user is mentioned (e.g., an "@" mention). Accordingly, representations on the interactive timeline 302 that correspond to a mention of a user can include an icon or a symbol such as "@", as shown in box 308. Representations of a second type (e.g., representations on the interactive timeline 302 with the number "2" therein) correspond to occurrences of a type of notable event in which a file is shared. Accordingly, representations on the interactive timeline 302 that correspond to a file being shared can include an icon or a symbol such as that shown in box 310. Representations of a third type (e.g., representations on the interactive timeline 302 with the number "3" therein) correspond to occurrences of a type of notable event in which a comment is submitted. Accordingly, representations on the interactive timeline 302 that correspond to a comment being submitted can include an icon or a symbol such as that shown in box 312. Representations of a fourth type (e.g., representations on the interactive timeline 302 with the number "4" therein) correspond to occurrences of a type of notable event in which a task is assigned. Accordingly, representations on the interactive timeline 302 that correspond to a task being assigned can include an icon or a symbol such as that shown in box 314. Representations of a fifth type (e.g., representations on the interactive timeline 302 with the number "5" therein) correspond to occurrences of a type of notable event in which a poll is conducted. Accordingly, representations on the interactive timeline 302 that correspond to a poll being conducted can include an icon or a symbol such as that shown in box 316. Representations of a sixth type (e.g., representations on the interactive timeline 302 with the number "6" therein) correspond to occurrences of a type of notable event in which a link to an external object is provided. Accordingly, representations on the interactive timeline 302 that correspond to a link to an external object (e.g., a meeting) can include an icon or a symbol such as that shown in box 318. Representations of a seventh type (e.g., representations on the interactive timeline 302 with the number "7" therein) correspond to occurrences of a type of notable event in which an expression (e.g., an emoji) is shared. Accordingly, representations on the interactive timeline 302 that correspond to an expression being shared can include an icon or a symbol such as that shown in box 320. The types of notable events 306 illustrated in FIG. 3 are provided herein as examples for illustrative purposes. Thus, other types of notable events are also contemplated, occurrences of which provide value and contribute to an understanding of a context of what has happened in a teleconference session.

In various implementations, a representation can also comprise and/or be associated with: a user avatar and/or initials of a user. Furthermore, a representation can comprise and/or be associated with a still image (e.g., a thumbnail image) that captures activity of a view of the teleconference session at a point in time associated with a position of the representation on the interactive timeline 302. For instance, a thumbnail image associated with a video frame can be displayed in association with a representation (e.g., below the representation, above the representation, etc.). In some examples, the thumbnail image can be persistently displayed. Alternatively, the thumbnail image can be configured to come into view based on user interaction (e.g., hover input) with the representation As described above, the interactive timeline 302 enables a user to interact with representations while viewing the recorded content 304. Since the content being displayed is recorded content, the interactive timeline 302 includes representations on the left and on the right of an interactive timeline cursor 322. The interactive timeline cursor 322 in this example represents a position, or a point, in the recording of the teleconference session that is currently being displayed. As shown, a user is currently viewing content at "00:15:23" of a meeting that had a duration of "00:25:46". The current view at this point in time comprises content in which four people (e.g., four separate audio/visual streams) are displayed in quadrants (e.g., four grid cells). A "view" comprises a configuration and/or a layout of content of the teleconference session. As illustrated, six representations (e.g., the circles labeled "1", "2", "3", "4", "5", "1") on the left of the interactive timeline cursor 322 represent notable events that occurred in association with content prior to the "00:15:23" mark and the three representations (e.g., the circles labeled "3", "6", "7") on the right of the interactive timeline cursor 322 represent notable events that occurred in association with content after the "00:15:23" mark. FIG. 3 also illustrates a play/pause button 324 that enables a viewer to play/pause the recorded content.

Figure 4:
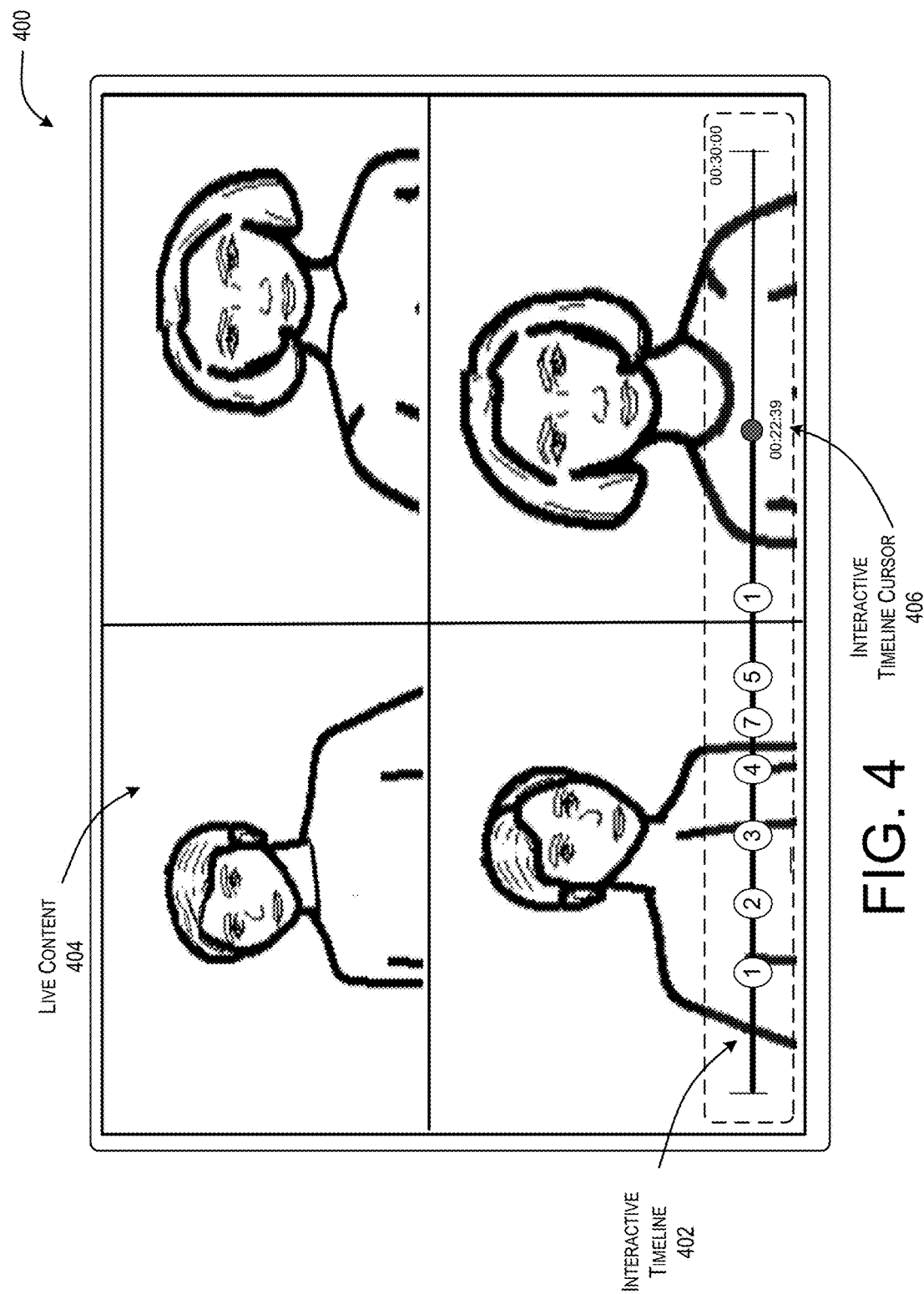
FIG. 4 illustrates an example graphical user interface configured to display an interactive timeline in association with live content and to enable a user to interact with representations on the interactive timeline while viewing the live content, the representations corresponding to notable events of differing types.

FIG. 4 illustrates an example graphical user interface 400 configured to display an interactive timeline 402 in association with live content 404. Similar to FIG. 3, the interactive timeline 402 is displayed at the bottom of the user interface 400 that is presented on a display screen (e.g., display screen 128). However, in this example, a display area that includes the interactive timeline 402 is an overlay display area that is transparent.

The interactive timeline 402 includes different representations (e.g., the circles on the interactive timeline 402) that correspond to different types of notable events (e.g., the example types of notable events 306 illustrated in FIG. 3). As described above, the interactive timeline 402 enables a user to interact with representations while viewing the live content 404. Since the content being displayed is live content, the interactive timeline 402 only includes representations on the left of an interactive timeline cursor 406. The interactive timeline cursor 406 in this example represents a position, or a point, in a live teleconference session. As shown, twenty-two minutes and thirty-nine seconds (e.g., "00:22:39") of a scheduled thirty minute (e.g., "00:30:00") meeting has already elapsed. The current view at this point in time comprises content in which four people (e.g., four separate audio/visual streams) are displayed in quadrants (e.g., four grid cells). As illustrated, seven representations (e.g., the circles labeled by "1", "2", "3", "4", "7", "5", "1") on the left of the interactive timeline cursor 406 represent notable events that occurred in association with content prior to the "00:22:39" mark and there are no representations on the right of the interactive timeline cursor 406 because that segment of the interactive timeline 402 between the "00:22:39" mark and the scheduled end of the meeting (e.g., the "00:30:00") represents time in the future.

Figure 5:
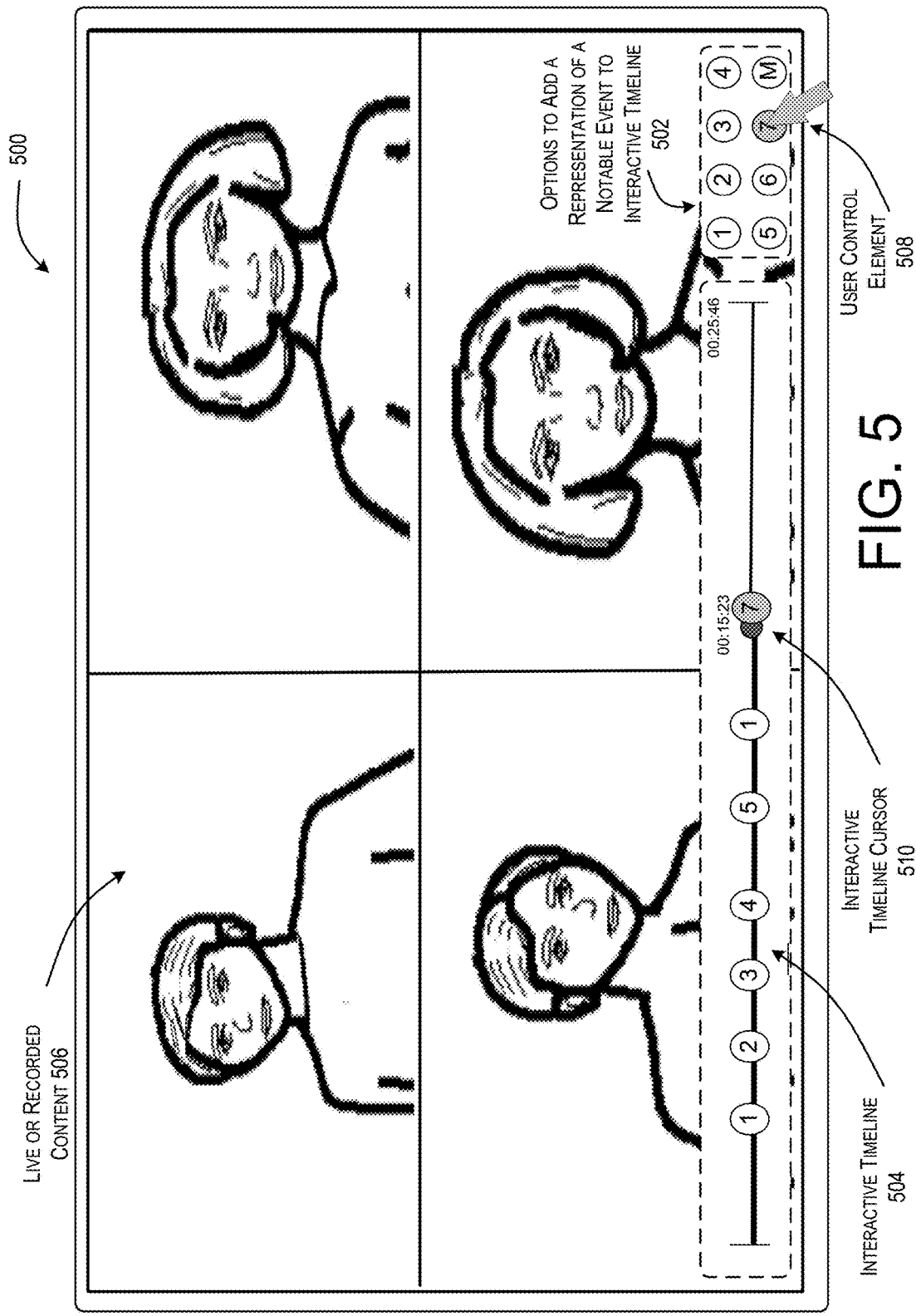
FIG. 5 illustrates an example graphical user interface configured to display options to add representations of notable events to an interactive timeline and to enable a user to select an option to add a representation of a notable event to the interactive timeline while viewing live or recorded content.

FIG. 5 illustrates an example graphical user interface 500 configured to display options 502 to add representations of different types of notable events to an interactive timeline 504 and to enable a user to select an option to add a representation of a particular type of notable event to the interactive timeline 504 while viewing live or recorded content 506. As shown, while viewing the live or recorded content 506, a user can move a user control element 508 such as a mouse cursor to an area on the display screen that contains the options 502. Upon selection of a particular type of notable event (e.g., the circle labeled "7" which represents an expression in this example), the interactive timeline module 146 can add a representation to the interactive timeline 504 at a position where the interactive timeline cursor 510 is currently located, as shown. In various examples, the user may be prompted to enter and/or provide information associated with the notable event (e.g., a file to be shared, details of a task to be assigned, a question and possible answers for a poll to be conducted, a URL to an external object, etc.).

Figure 6:
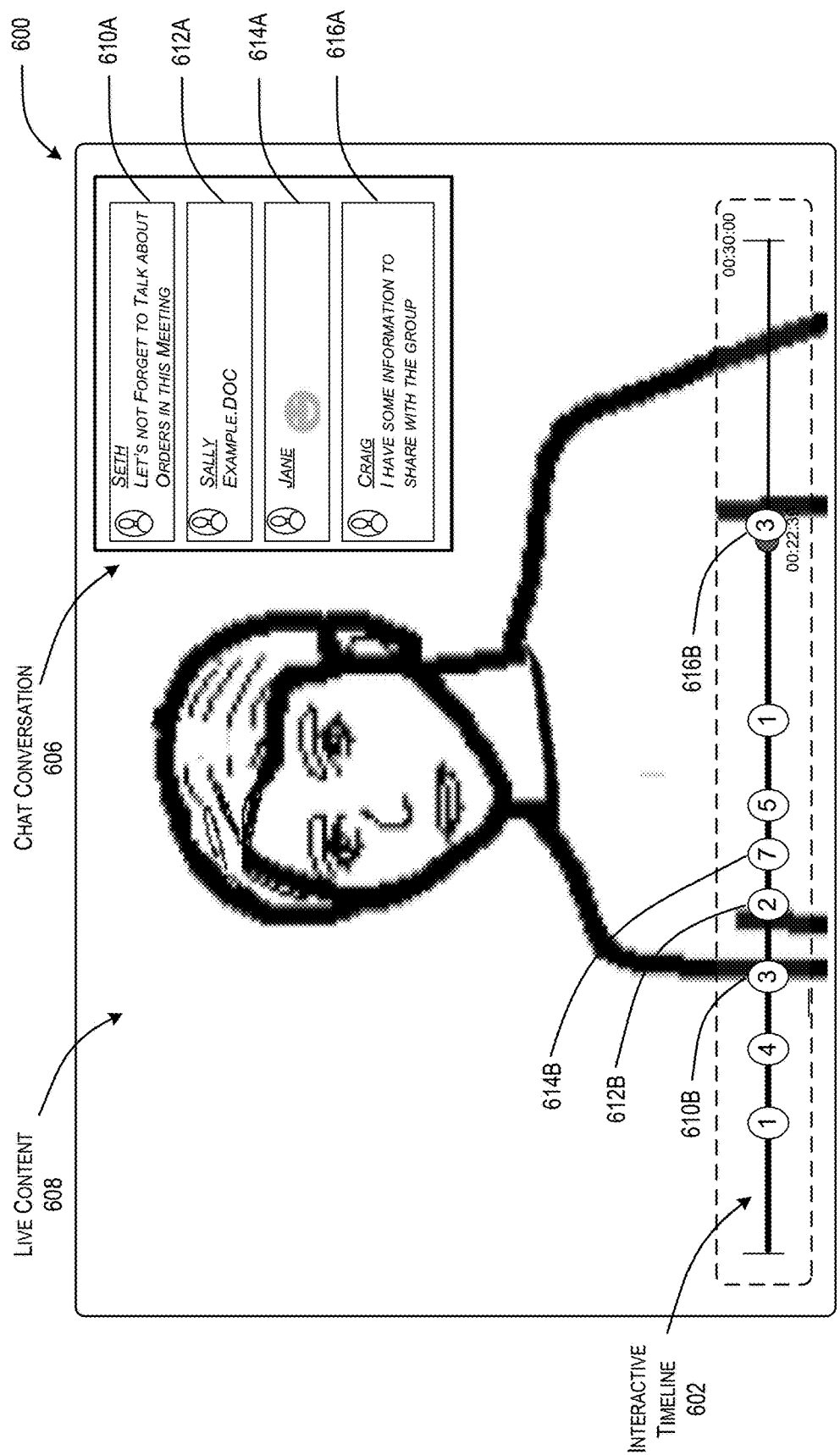
FIG. 6 illustrates an example graphical user interface that illustrates a detection of a notable event and an addition of a corresponding representation to an interactive timeline.

FIG. 6 illustrates an example graphical user interface 600 that illustrates a detection of a notable event and an addition of a corresponding representation to an interactive timeline 602. FIG. 6 illustrates a chat conversation 606 (e.g., a chat window) that is associated with live content 608 of a teleconference session.

In various examples, the interactive timeline module 146 is configured to detect occurrences of notable events in the chat conversation 606. For example, a first entry 610A into the chat conversation 606 by Seth includes a comment that is detected, and thus, a corresponding representation 610B of the notable event is added to the interactive timeline 602 in association with a time at which the comment is submitted by Seth. A second entry 612A into the chat conversation 606 by Sally includes a shared file (e.g., "Example.doc") that is detected, and thus, a corresponding representation 612B of the notable event is added to the interactive timeline 602 in association with a time at which the file is shared by Sally. A third entry 614A into the chat conversation 606 by Jane includes a shared expression (e.g., an emoji) that is detected, and thus, a corresponding representation 614B of the notable event is added to the interactive timeline 602 in association with a time at which the expression is shared by Jane. Lastly, a fourth entry 616A into the chat conversation 606 by Craig that just occurred includes another comment that is detected, and thus, a corresponding representation 616B of the notable event is added to the interactive timeline 602 in association with a current time/position of the interactive timeline cursor.

In various examples described herein, the interactive timeline 602 can be configured to graphically distinguish between notable events based on a user that is a source of the notable event (e.g., using different colors). In one scenario, a fill color of a representation can identify a user that is the source of the notable event (e.g., Seth is associated with the color green, Sally is associated with the color red, Jane is associated with the color yellow, Craig is associated with the color blue, etc.). In another scenario, if the fill color of a representation identifies a type of notable event, then a border color that surrounds the fill color of the representation can identify a user that is the source of the notable event.

Figure 7A:
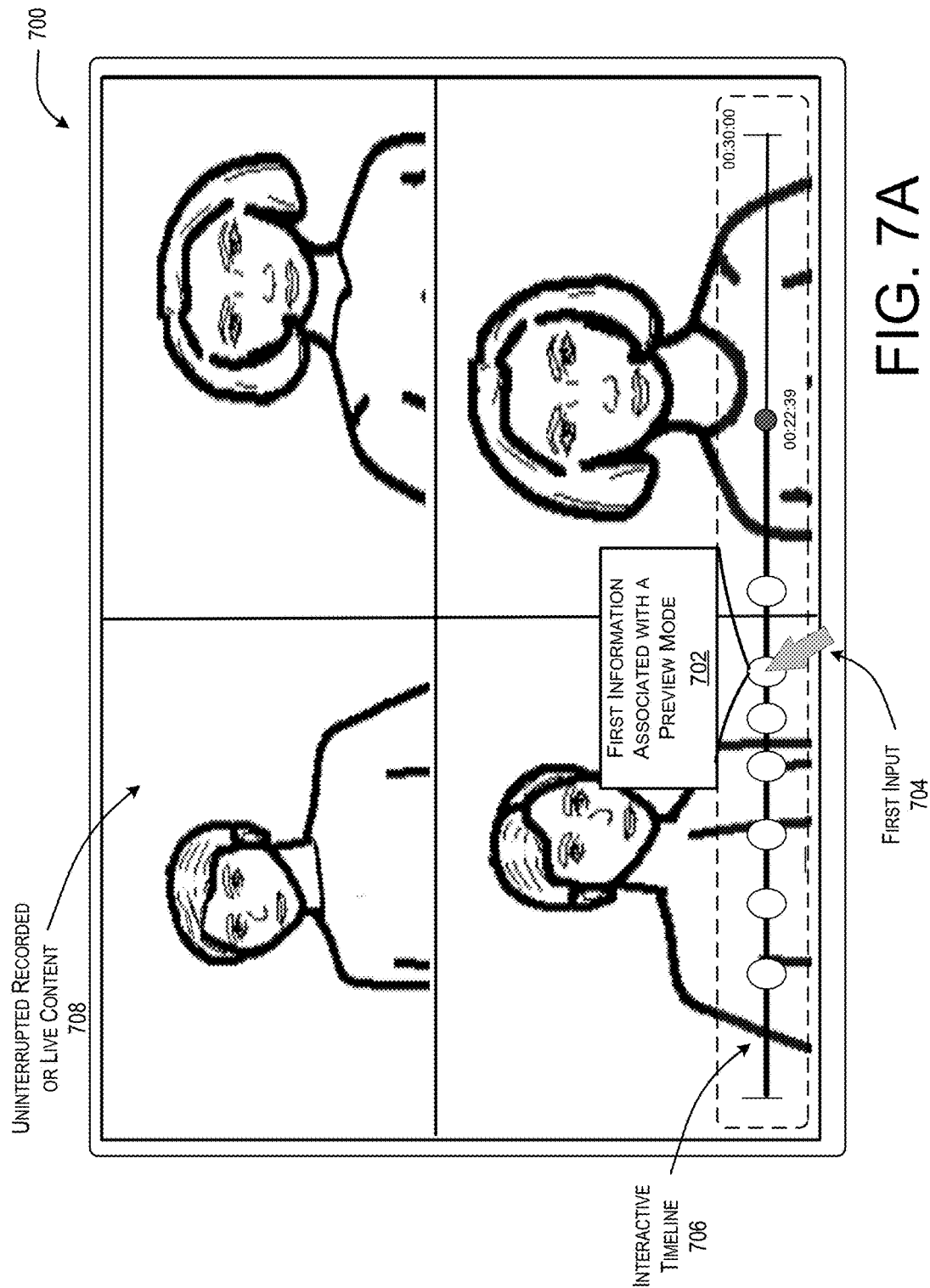
FIG. 7A illustrates an example graphical user interface configured to display first information associated with a notable event based on first input associated with a representation on the interactive timeline, the first information being displayed without interrupting the live or recorded content currently being displayed on the display screen with respect to a position of an interactive timeline cursor.

FIG. 7A illustrates an example graphical user interface 700 configured to display first information 702 associated with a notable event based on first input 704 associated with a representation on the interactive timeline 706. As described above, the first information 702 displayed is associated with a preview mode, and in various examples, includes information that generally describes and/or encapsulates a notable event. The first information 702 is displayed without interrupting the live or recorded content 708 of the teleconference session that is currently being displayed on the display screen. That is, in association with the preview mode, the live or recorded content 708 of the teleconference session can continue to be displayed in a current view associated with a position of an interactive timeline cursor (e.g., "00:22:39" in the example of FIG. 7A). In one example, the first information 702 can be displayed in an overlay area (e.g., an overlay pop-up window) on top of the live or recorded content 708 in response to a user hovering a user control element such as a mouse cursor over a representation. The first information 702 can be displayed as long as the user hovers over the representation, or the first information 702 can be displayed for a predetermined period of time (e.g., three seconds, five seconds, etc.). Consequently, the recorded or live content can continue to be displayed (e.g., played back) without interruption (e.g., without altering the view of the recorded or live content).

In various examples, the first information 702 can include one or more of: identification information (e.g., name, avatar, alias, etc.) associated with a user that is a source of the notable event, identification information associated with one or more users to which the notable event is directed, text of an individual comment that is submitted to a chat conversation associated with the teleconference session, a name of a file that is shared, a general description of a task that is assigned, an option to submit a vote for a poll that is conducted, or a link to an external object.

Figure 7B:
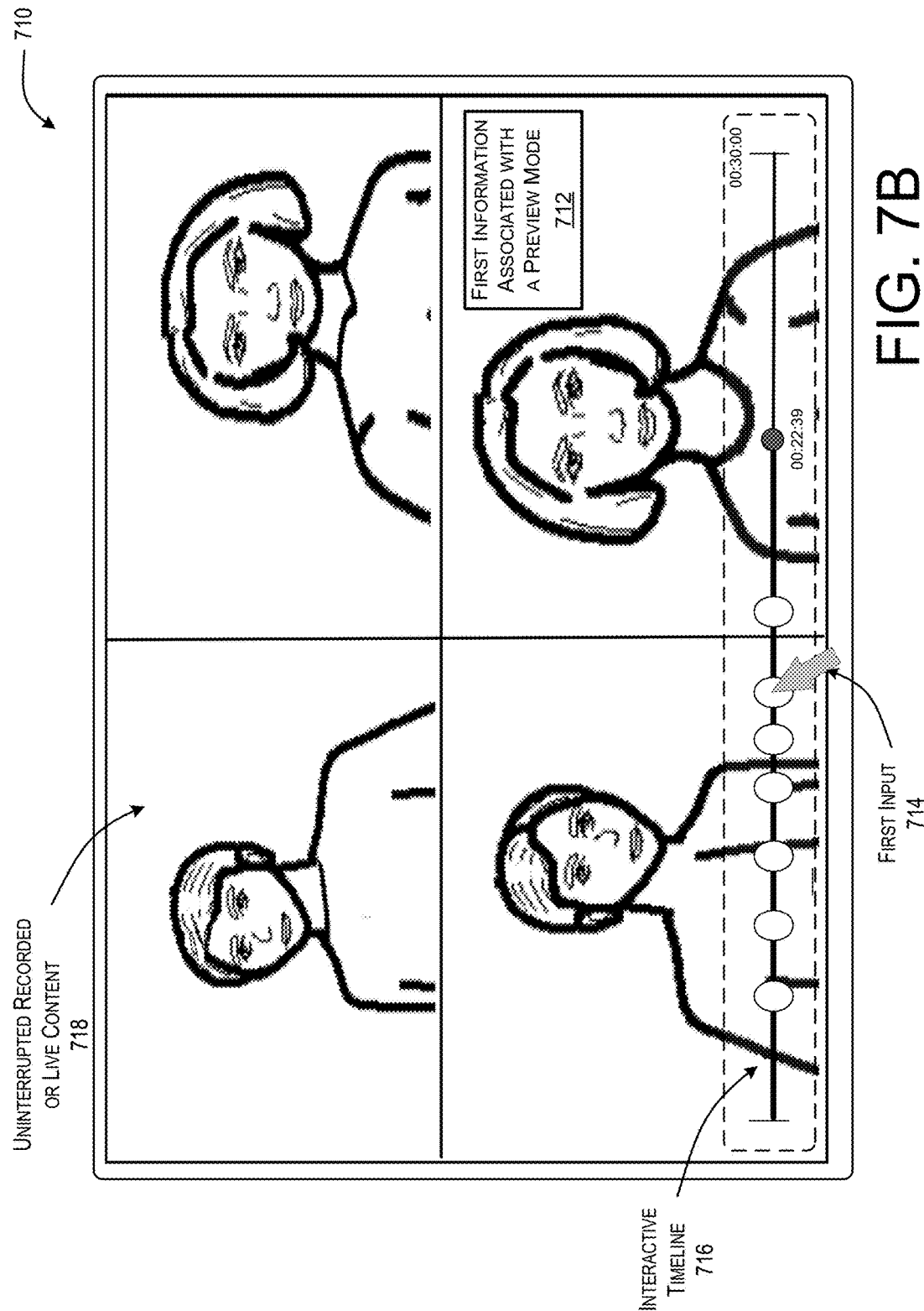
FIG. 7B illustrates another example graphical user interface configured to display first information associated with a notable event based on first input associated with a representation on the interactive timeline, the first information being displayed without interrupting the live or recorded content currently being displayed on the display screen with respect to a position of an interactive timeline cursor.

FIG. 7B illustrates another example graphical user interface 710 configured to display first information 712 associated with a notable event based on first input 714 associated with a representation on the interactive timeline 716. Similar to the example in FIG. 7A, the first information 712 is displayed without interrupting live or recorded content 718 of the teleconference session that is currently being displayed on the display screen. However, in the example of FIG. 7B, the first information 712 is displayed in an overlay area (e.g., an overlay pop-up window) that is intelligently positioned on top of the live or recorded content 718 in response to a user hovering a user control element such as a mouse cursor over a representation. For instance, the intelligent positioning of the first information 712 can move a "floating" overlay area away from the representation to limit the amount of visual interference to the displayed content (e.g., in this example, the floating overlay area is intelligently positioned on the right side of the user interface so that it does not cover up significant activity in the middle of the user interface such as user motion).

FIG. 8A illustrates an example graphical user interface 800 configured to display second information 802 associated with a notable event based on second input 804 associated with a representation on the interactive timeline. As shown, a view switch 806 is implemented to accommodate the displaying of the second information 802. A view switch can affect (e.g., alter) the layout of the live or the recorded content currently being displayed in association with a current position of an interactive timeline cursor.

As described above, the second information 802 associated with a notable event can be displayed in association with a detailed mode that enables a user to take a deeper dive and view additional and more detailed information about the notable event. This can happen after the user views the first information 702 associated with the preview mode, as shown in FIG. 8A.

In various examples, the second information displayed in association with the detailed mode comprises one or more of: a recorded portion of the teleconference session associated with a time on the interactive timeline with which the notable event is associated, a part of a chat conversation that in which a comment is submitted (e.g., other comments that surround an individual comment), a display area of a recorded portion of the teleconference session associated with a time on the interactive timeline with which the notable event is associated, content of a file that is shared (e.g., a document page, a slide of a presentation, etc.), details of a task that is assigned (e.g., step-by-step instructions), results of a poll that is conducted, or information accessible via selection of a link to an external object.

In the example of FIG. 8A, the second input 804 comprises a selection (e.g., a click) of the overlay window that contains the first information 702. Based on receiving the second input 804, the interactive timeline module 146 is configured to implement the view switch 806 such that the current view on the left in FIG. 8A (e.g., the layout that illustrates four people in different quadrants) is switched to a different view on the right in FIG. 8A to accommodate the display of the second information 802 associated with the notable event. In the example of FIG. 8A, the different view can comprise a recorded portion of the teleconference session that contains an occurrence of the notable event. For example, the recorded portion can be a segment of the teleconference session in which the user says another user's name. In another example, the recorded portion can be a segment of the teleconference session in which a user shares an expression in response to what is being said by a main speaker. In various examples, the recorded portion can completely replace the current content being displayed (e.g., an edge-to-edge view).

FIG. 8B illustrates another example graphical user interface 808 configured to display second information 810 associated with a notable event based on second input 812 associated with a representation on the interactive timeline. As shown, another view switch 814 is implemented to accommodate the displaying of the second information 810.

In the example of FIG. 8B, the second input 812 comprises a selection (e.g., a click) of the representation associated with the overlay window that contains the first information 702. Based on receiving the second input 812, the interactive timeline module 146 is configured to implement the view switch 814 such that the current view on the left in FIG. 8B (e.g., the layout that illustrates four people in different quadrants) is switched to a different view on the right in FIG. 8B to accommodate the display of the second information 810 associated with the notable event. For instance, the view can be a concurrent view (e.g., side-by-side, top and bottom, non-overlapping display areas). In the example of FIG. 8B, the different view can comprise the display of part of a chat conversation that includes the individual comment associated with the representation. As shown, the different view still displays the content of the teleconference session associated with the interactive timeline cursor, but a size of the display area is decreased to accommodate a new display area that contains the second information 810. By presenting the second information 810 which includes other comments that surround a comment of interest to the user, the user may gain a better understanding of a context in which the comment was submitted.

FIG. 8C illustrates yet another example graphical user interface 816 configured to display second information 818 associated with a notable event based on second input 820 associated with a representation on the interactive timeline. As shown, yet another view switch 822 is implemented to accommodate the displaying of the second information 818.

In the example of FIG. 8C, the second input 820 comprises a selection (e.g., a click) of the overlay window that contains the first information 702 associated with the representation. Based on receiving the second input 820, the interactive timeline module 146 is configured to implement the view switch 822 such that the current view on the left in FIG. 8C (e.g., the layout that illustrates four people in different quadrants) is switched to a different view on the right in FIG. 8C to accommodate the display of the second information 818 associated with the notable event. For instance, the view can be a concurrent view (e.g., side-by-side, top and bottom, non-overlapping display areas). In the example of FIG. 8C, the different view can comprise the display of file content (e.g., slides of a presentation) associated with a shared file. Similar to FIG. 8B, the different view in FIG. 8C still displays the content of the teleconference session associated with the interactive timeline cursor, but a size of the display area is decreased to accommodate a new display area that contains the second information 818.

Figure 8D:
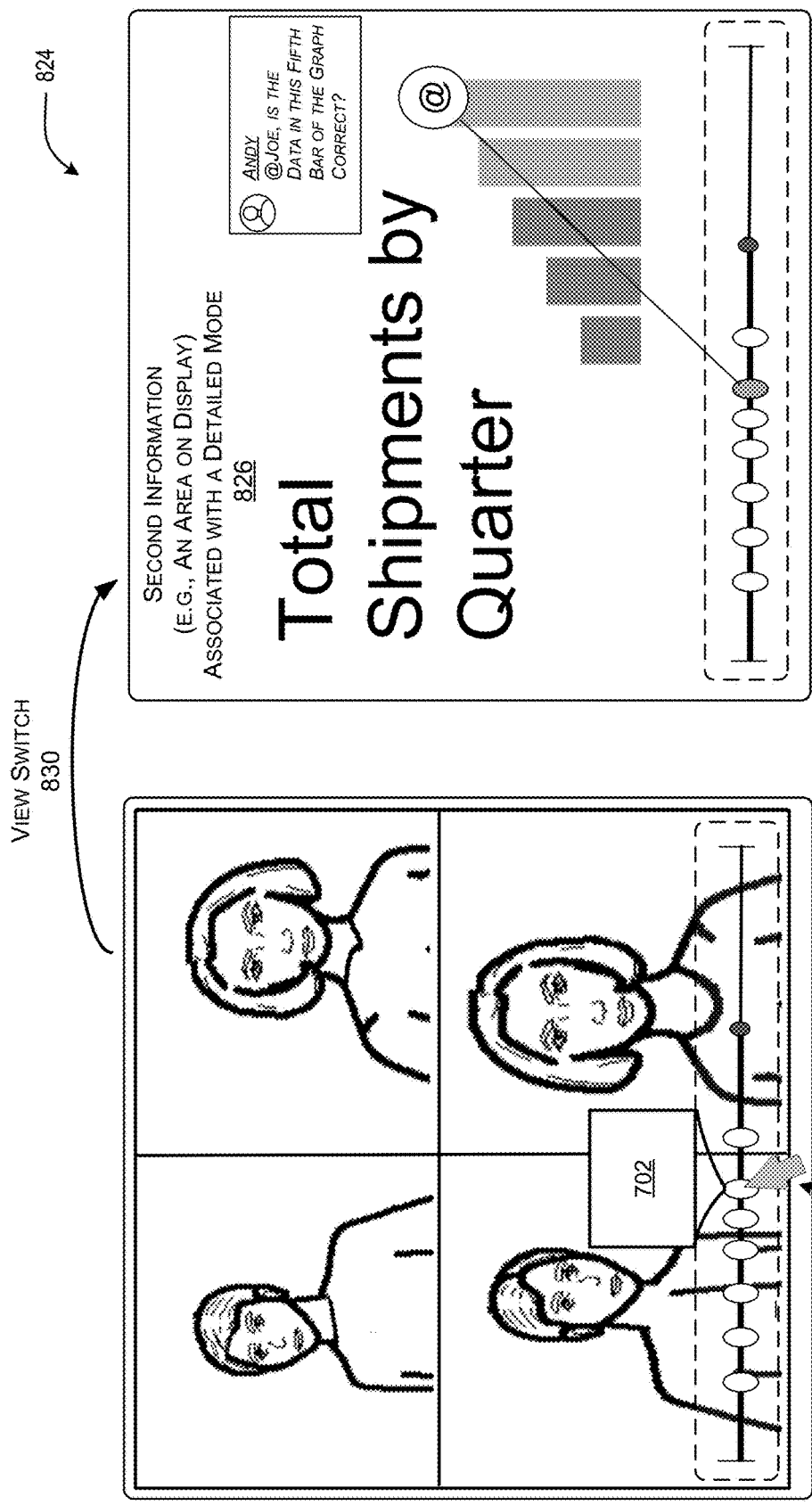
FIG. 8D illustrates a further example graphical user interface configured to display second information associated with a notable event based on second input associated with a representation on the interactive timeline, the second information being displayed in association with a view switch.

FIG. 8D illustrates a further example graphical user interface 824 configured to display second information 826 associated with a notable event based on second input 828 associated with a representation on the interactive timeline. As shown, a further view switch 830 is implemented to accommodate the displaying of the second information 826.

In the example of FIG. 8D, the second input 828 comprises a selection (e.g., a click) of the representation associated with the overlay window that contains the first information 702. Based on receiving the second input 828, the interactive timeline module 146 is configured to implement the view switch 830 such that the current view on the left in FIG. 8D (e.g., the layout that illustrates four people in different quadrants) is switched to a different view on the right in FIG. 8D to accommodate the display of the second information 826 associated with the notable event. The second information 826 in the example of FIG. 8D comprises a display area of a recorded portion of the teleconference session associated with a time on the interactive timeline with which the notable event is associated. That is, a mention of a user and/or a comment are graphically associated with (i) a particular data set displayed (e.g., an individual bar in a bar graph) and (ii) a representation on the interactive timeline. Specifically, the notable event is Andy asking Joe (e.g., "@Joe")—"Is the data in this fifth bar of the graph correct?"

Figure 8E:
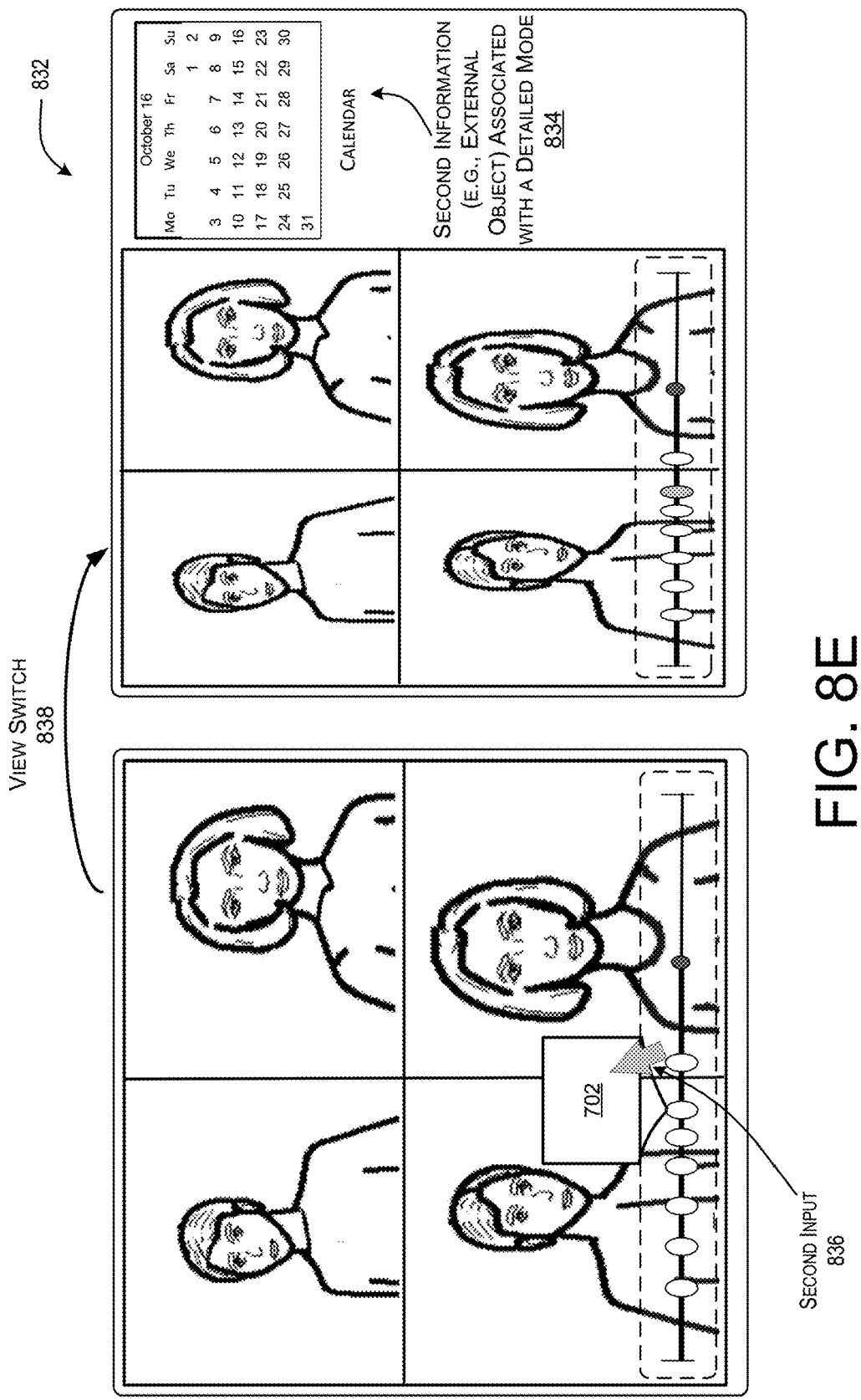
FIG. 8E illustrates even a further example graphical user interface configured to display second information associated with a notable event based on second input associated with a representation on the interactive timeline, the second information being displayed in association with a view switch.

FIG. 8E illustrates even a further example graphical user interface 832 configured to display second information 834 associated with a notable event based on second input 836 associated with a representation on the interactive timeline. As shown, a further view switch 838 is implemented to accommodate the displaying of the second information 834.

In the example of FIG. 8E, the second input 836 comprises a selection (e.g., a click) of the overlay window that contains the first information 702 associated with the representation. Based on receiving the second input 836, the interactive timeline module 146 is configured to implement the view switch 838 such that the current view on the left in FIG. 8E (e.g., the layout that illustrates four people in different quadrants) is switched to a different view on the right in FIG. 8E to accommodate the display of the second information 834 associated with the notable event. For instance, the view can be a concurrent view (e.g., side-by-side, top and bottom, non-overlapping display areas). In the example of FIG. 8E, the different view can comprise the display of information associated with a linked external object (e.g., a meeting object in a calendar application). Similar to FIG. 8B, the different view in FIG. 8E still displays the content of the teleconference session associated with the interactive timeline cursor, but a size of the display area is decreased to accommodate a new display area that contains the second information 834.

As described above, an interactive timeline can be configured to graphically distinguish between representations that are added during a live viewing of a teleconference session and representations that are added during a recorded viewing of the teleconference session. In this way, a viewer can quickly understand notable events that occurred during the teleconference session and notable events that were added after the teleconference session ended.

Figure 9A:
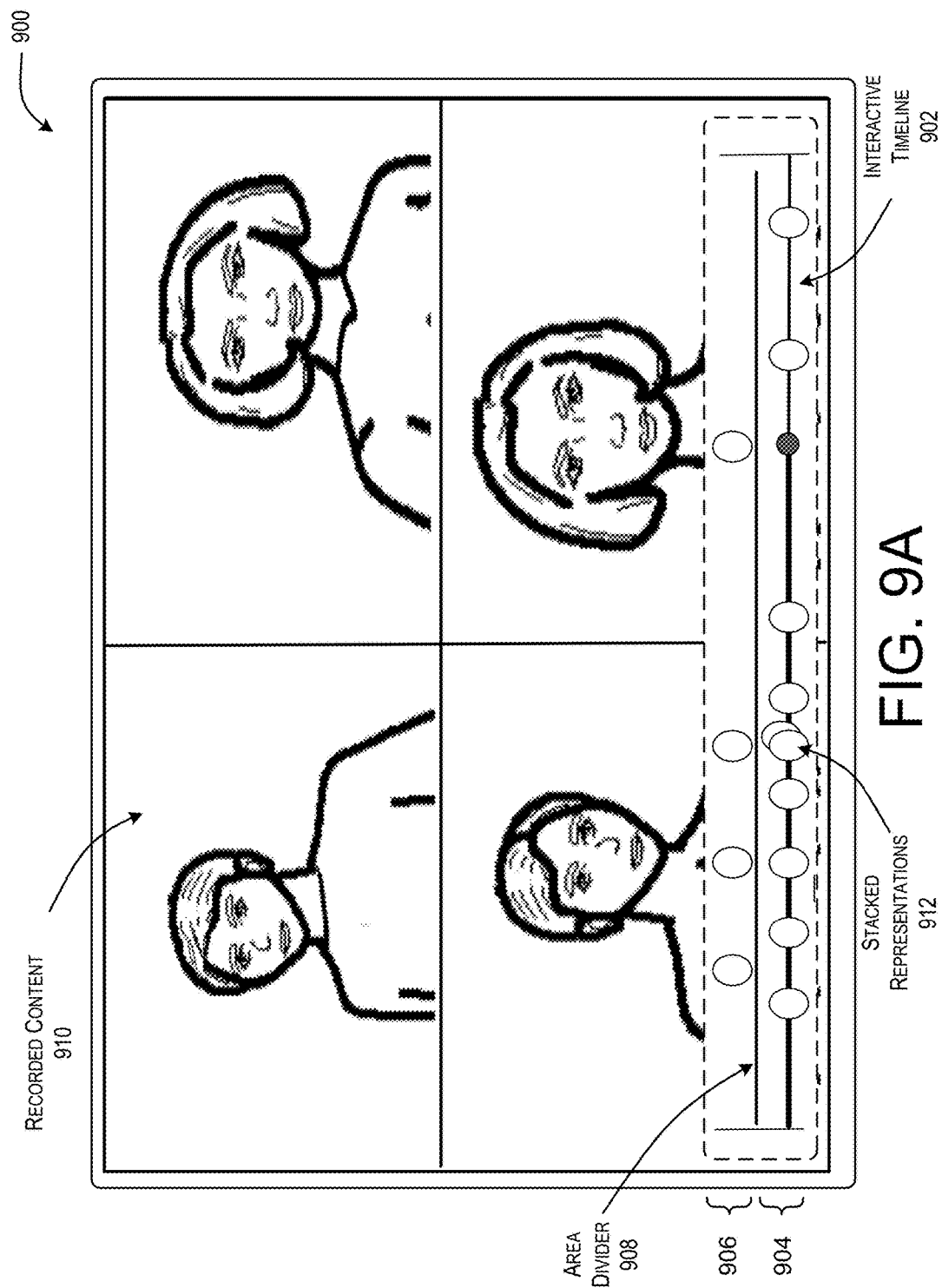
FIG. 9A illustrates an example graphical user interface configured to distinguish, in association with an interactive timeline, between a first set of representations corresponding to a first set of notable events that occur during a live viewing of the teleconference session and a second set of representations corresponding to a second set of notable events that occur during a recorded viewing of the teleconference session.

FIG. 9A illustrates an example graphical user interface 900 configured to distinguish, in association with an interactive timeline 902, between a first set of representations corresponding to a first set of notable events that occur during a live viewing of the teleconference session and a second set of representations corresponding to a second set of notable events that occur during a recorded viewing of the teleconference session. In the example of FIG. 9A, the graphical distinction can be based on display location on a display screen. That is, the first set of representations can be displayed in a first visual display area 904 (e.g., a first layer) on the interactive timeline 902 while the second set of representations can be displayed in a second visual display area 906 (e.g., a second layer) associated with the interactive timeline 906. The display areas can be offset by height on the display screen and/or can include an area divider 908, as shown. Consequently, a user viewing the recorded content 910 in FIG. 9A is aware of which notable events occurred during a live viewing of the teleconference session and which notable events occurred during a recorded viewing of the teleconference session.

In various examples, an individual visual display area such as a layer can be associated with each viewing of the content of the teleconference session. In this way, the first visual display area 904 can include representations of notable events associated with actual participants to the live viewing of the teleconference session, the second visual display area 906 can include representations of notable events associated with a first user to separately view a recording of the teleconference session, a third visual display area on top of the second visual display area 906 can include representations of notable events associated with a second user to separately view a recording of the teleconference session, and so forth.

In various examples, multiple (e.g., two or more) representations of notable events that occur at the same time or at times close to one another (e.g., within three seconds, within seven seconds, etc.) can be presented on the interactive timeline 902 as "stacked" representations 912. Stacked representations 912 can indicate some sort of relationship between notable events (e.g., one user asks a question in a comment and another user answers the question in a reply to the comment).

FIG. 9B illustrates another example graphical user interface 914 configured to distinguish, in association with an interactive timeline 916, between a first set of representations corresponding to a first set of notable events that occur during a live viewing of the teleconference session and a second set of representations corresponding to a second set of notable events that occur during a recorded viewing of the teleconference session. In the example of FIG. 9B, the graphical distinction can be based on display color. That is, the first set of representations can be displayed in a first color (e.g., the white representations) on the interactive timeline 916 while the second set of representations a second color (e.g., the shaded or dark representations) on the interactive timeline 916.

Figure 10:
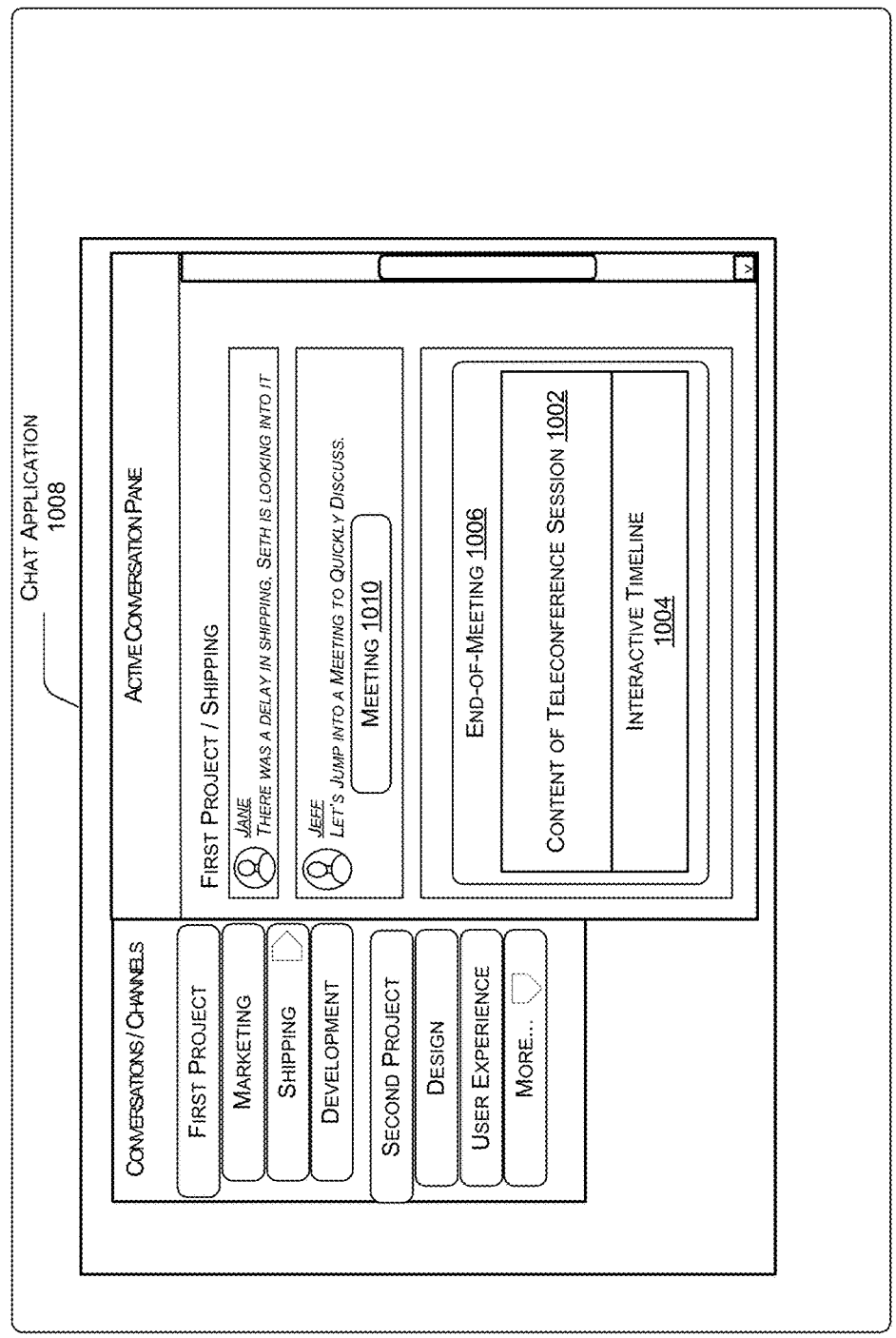
FIG. 10 illustrates an example graphical user interface configured to display, and to enable a user to view, an interactive timeline in association with an end-of-session object embedded in content of an application (e.g., a chat application).

FIG. 10 illustrates an example graphical user interface 1000 configured to display, and to enable a user to view, content of a teleconference session 1002 and/or an interactive timeline 1004 in association with an end-of-session object (e.g., an end-of-meeting object 1006). The end-of-meeting object can be embedded in content of an application. In various examples, the application can be separate from, or external to, a teleconference application. FIG. 10 illustrates a chat application 1008 with which a user may be interacting, the chat application 1008 displaying various conversations/channels and/or an active conversation pane with comments. While interacting with the active conversation pane of the chat application 1008, the user can see when Jeff created a meeting object 1010 and shared the meeting object with a group or users. Moreover, a user can see when the end-of-meeting object 1006 is added to the chat conversation and shared with a group of users. The end-of-meeting object 1006 embedded in the active conversation pane enables the user to view recorded content and/or interact with representations of notable events on the interactive timeline 1004 without leaving the active conversation pane. In some examples, the end-of-meeting object 1006 is automatically added to the chat conversation after the meeting has ended. In various examples, the notable events displayed in the interactive timeline 1004 can be filtered based on priority or significance so they can be scaled to fit within a smaller display space and so that the smaller display space is not overcrowded.

Figure 11:
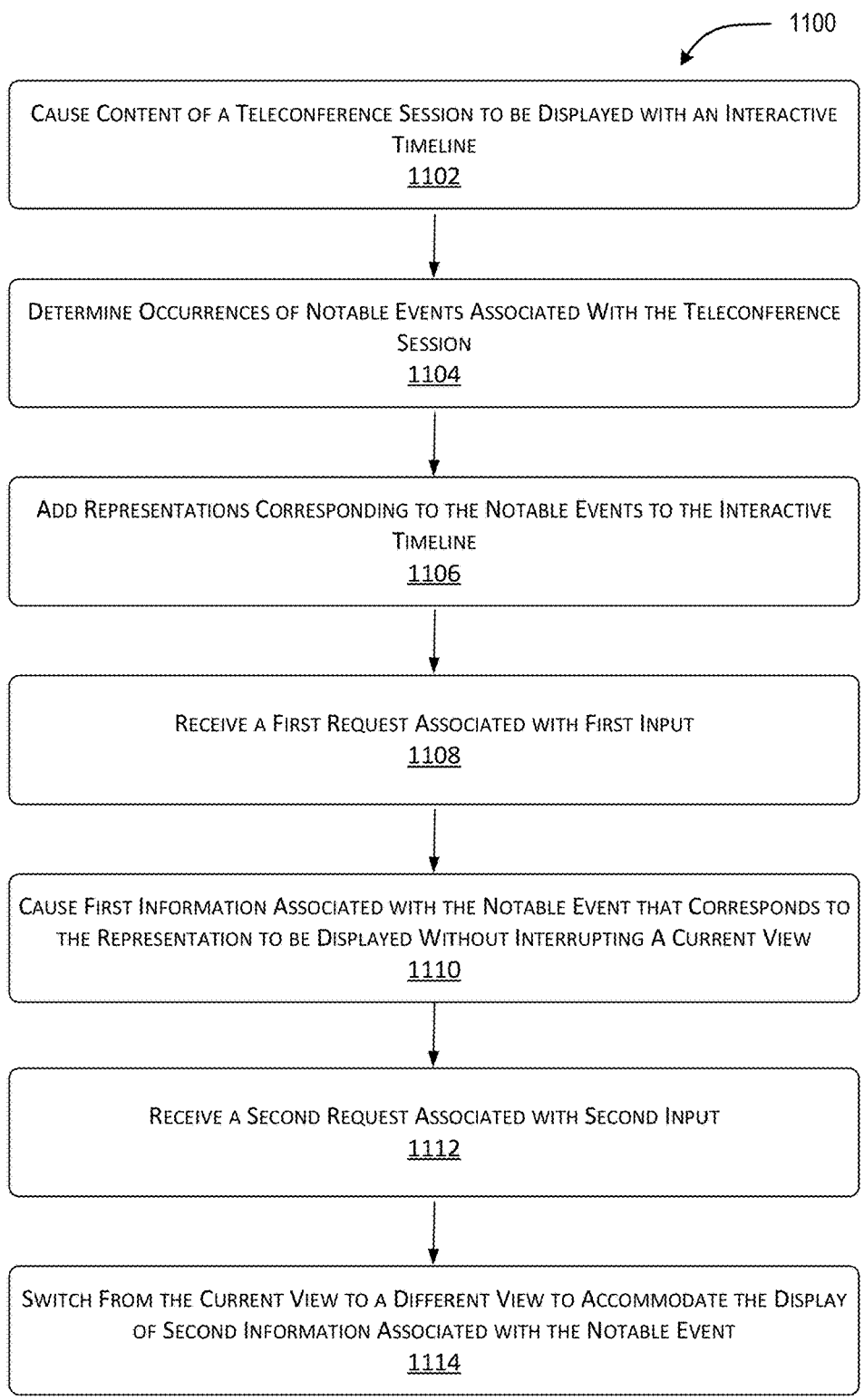
FIG. 11 is a diagram of an example flowchart that illustrates operations directed to displaying an interactive timeline and different amount of information associated with a notable event based on different inputs.
Figure 12:
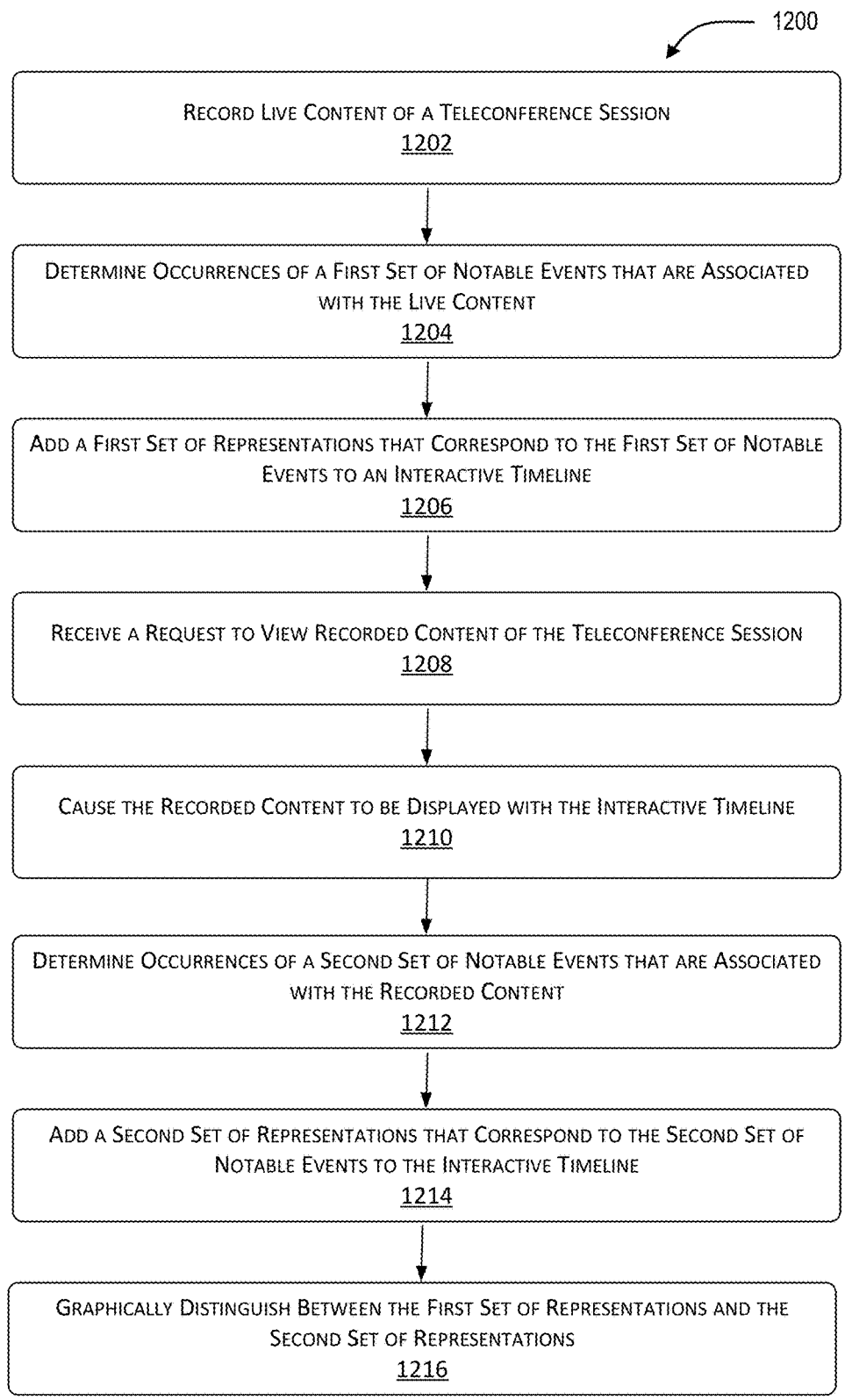
FIG. 12 is a diagram of an example flowchart that illustrates operations directed to adding a first set of representations to an interactive timeline based on a first set of notable events that occur during a live viewing of the teleconference session and subsequently adding a second set of representations to the interactive timeline based on a second set of notable events that occur during a recorded viewing of the teleconference session, and distinguishing between the first set of representations and the second set of representations.

FIGS. 11 and 12 illustrate example flowcharts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., device 110, client computing device 106(1), client computing device 106(N), and/or device 200) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIGS. 11 and/or 12 can be implemented in association with the example graphical user interfaces described above with respect to FIGS. 3-10. For instance, the various device(s) and/or module(s) in FIGS. 1 and/or 2 can generate, transmit, and/or display data associated with content of a teleconference session and/or an interactive timeline that includes representations of notable events that occur in association with the teleconference session.

FIG. 11 is a diagram of an example flowchart 1100 that illustrates operations directed to displaying an interactive timeline and different amount of information associated with a notable event based on different inputs.

At operation 1102, content of a teleconference session is caused to be displayed (e.g., data is transmitted) with an interactive timeline on a display screen associated with a client computing device. As described above, the interactive timeline is configured to display different types of representations corresponding to different types of notable events that occur in association with a teleconference session.

At operation 1104, occurrences of notable events associated with the teleconference session are determined. For instance, session data can be analyzed to detect when a notable event occurs (e.g., a user says a name, a user submits a comment to a chat conversation, etc.). Moreover, a user can specifically add a representation of a notable event to the interactive timeline (e.g., via selection of an option to add a notable event to the interactive timeline).

At operation 1106, representations corresponding to the notable events are added to the interactive timeline. Consequently, the interactive timeline is populated with representations that reflect a context of activity that occurs in the teleconference session (e.g., during a live viewing or a recorded viewing).

At operation 1108, a first request associated with first input is received. The first request and the first input can be associated with a representation on the interactive timeline. In one example, the first input comprises hovering of a user control element over the representation.

At operation 1110, first information associated with the notable event that corresponds to the representation is caused to be displayed without interrupting a current view of content being displayed. The first information can include general and/or broad information related to the notable event, or information that describes or summarizes the notable event.

At operation 1112, a second request associated with second input is received. The second request and the second input can be associated with the representation. In one example, the second input comprises selection (e.g., a click) of the representation.

At operation 1114, the current view is switched to a different view to accommodate the display of second information associated with the notable event. Examples of view switches are provided above with respect to FIGS. 8A-8E.

FIG. 12 is a diagram of an example flowchart 1200 that illustrates operations directed to adding a first set of representations to an interactive timeline based on a first set of notable events that occur during a live viewing of the teleconference session and subsequently adding a second set of representations to the interactive timeline based on a second set of notable events that occur during a recorded viewing of the teleconference session, and distinguishing between the first set of representations and the second set of representations.

At operation 1202, live content of a teleconference session is recorded.

At operation 1204, occurrences of a first set of notable events that are associated with the live content are determined.

At operation 1206, a first set of representations that correspond to the first set of notable events are added to an interactive timeline.

At operation 1208, a request to view recorded content of the teleconference session is received.

At operation 1210, the recorded content is caused to be displayed on the interactive timeline.

At operation 1212, occurrences of a second set of notable events that are associated with the recorded content are determined.

At operation 1214, a second set of representations that correspond to the second set of notable events are added to the interactive timeline.

At operation 1216, the first set of representations and the second set of representation are graphically distinguished from one another. For example, the first set of representations and the second set of representation can be graphically distinguished by display location and/or color.

The disclosure presented herein may be considered in view of the following example clauses.

Example Clause A, a system comprising: one or more processing units; and a computer-readable medium having encoded thereon computer-executable instructions to cause the one or more processing units to: cause content of a teleconference session to be displayed; cause an interactive timeline associated with the teleconference session to be displayed, wherein the interactive timeline includes a plurality of representations that correspond to a plurality of notable events associated with the teleconference session and wherein the plurality of representations are of one or more different types; receive a first request associated with a representation of the plurality of representations while the content of the teleconference session continues to be displayed in association with a current view; based at least in part on receiving the first request, cause first information to be displayed while the content of the teleconference session continues to be displayed in association with the current view, the first information describing a notable event that corresponds to the representation; receive a second request associated with the representation; and based at least in part on receiving the second request, switch from the current view to a different view to display second information associated with the notable event.

Example Clause B, the system of Example Clause A, wherein the first request is associated with hovering of a user control element over the representation.

Example Clause C, the system of Example Clause A or Example Clause B, wherein the computer-executable instructions further cause the one or more processing units to cause the first information to be displayed in an overlay display area on top of the content of the teleconference session being displayed in association with the current view.

Example Clause D, the system of any one of Example Clause A through Example Clause C, wherein the plurality of notable events are different types of notable events comprising at least two of: a mention of a user; a file that is shared; a comment that is submitted to a chat conversation; a task that is assigned; a poll that is conducted; an expression that is shared; or a link to an external object.

Example Clause E, the system of any one of Example Clause A through Example Clause D, wherein the first information comprises one or more of: identification information associated with a user that is a source of the notable event; identification information associated with one or more users to which the notable event is directed; text of an individual comment that is submitted to a chat conversation; a name of a file that is shared; a general description of a task; an option to submit a vote for a poll; or a link to an external object.

Example Clause F, the system of Example E, wherein the second information provides more detail about the notable event than the first information, the second information comprising one or more of: a recorded portion of the teleconference session associated with a time on the interactive timeline with which the notable event is associated; a part of a chat conversation in which a comment is submitted; a display area of a recorded portion of the teleconference session associated with a time on the interactive timeline with which the notable event is associated; content of a file that is shared; details of a task that is assigned; results of a poll that is conducted; or information accessible via selection of a link to an external object.

Example Clause G, the system of any one of Example Clause A through Example Clause F, wherein the computer-executable instructions further cause the one or more processing units to: cause an option that enables a user to add a notable event of a particular type to the interactive timeline to be displayed; receive a selection of the option; and add the notable event of the particular type to the interactive timeline based at least in part on the selection.

Example Clause H, the system of any one of Example Clause A through Example Clause G, wherein the computer-executable instructions further cause the one or more processing units to graphically distinguish, using different colors, between a first notable event and a second notable event of the plurality of notable events based on a first user being a first source of the first notable event and a second user being a second source of the second notable event.

Example Clause I, the system of any one of Example Clause A through Example Clause H, wherein the computer-executable instructions further cause the one or more processing units to: detect an occurrence of at least one of the plurality of notable events during the teleconference session; and add the at least one of the plurality of notable events to the interactive timeline based at least in part on the detecting.

Example Clause J, the system of Example Clause I, wherein the at least one of the plurality of notable events occurs based on input into a chat conversation that is associated with the teleconference session.

Example Clause K, the system of any one of Example Clause A through Example Clause J, wherein the content of the teleconference session comprises recorded content.

Example Clause L, the system of any one of Example Clause A through Example Clause J, wherein the content of the teleconference session comprises live content.

Example Clause M, the system of any one of Example Clause A through Example Clause L, wherein the different view comprises a first display area that includes the content of the teleconference session that corresponds to a position of an interactive timeline cursor and a second display area that includes the second information associated with the notable event.

Example Clause N, the system of any one of Example Clause A through Example Clause L, wherein switching from the current view to the different view comprises replacing the content of the teleconference session that corresponds to a position of an interactive timeline cursor with the second information associated with the notable event.

While Example Clauses A through N are described above with respect to a system, it is also understood in the context of this document that Example Clauses A through N can be implemented by a device, via instructions stored on computer-readable storage media, and/or as a method.

Example Clause O, a system comprising: one or more processing units; and a computer-readable medium having encoded thereon computer-executable instructions to cause the one or more processing units to: record live content of a teleconference session; determine occurrences of a first set of notable events that are associated with the live content of the teleconference session; add, to an interactive timeline associated with the teleconference session, a first set of representations that correspond to the first set of notable events; receive a request to view recorded content of the teleconference session; cause the recorded content of the teleconference session to be displayed; cause the interactive timeline associated with the teleconference session to be displayed; determine occurrences of a second set of notable events associated with the recorded content of the teleconference session; and add, to the interactive timeline associated with the teleconference session, a second set of representations that correspond to the second set of notable events, wherein the interactive timeline graphically distinguishes between the first set of representations and the second set of representations.

Example Clause P, the system of Example Clause O, wherein the interactive timeline graphically distinguishes between the first set of representations and the second set of representations using colors.

Example Clause Q, the system of Example Clause O, wherein the interactive timeline graphically distinguishes between the first set of representations and the second set of representations using display locations.

Example Clause R, the system of any one of Example Clause O through Example Clause Q, wherein, prior to receiving the request to view the recorded content of the teleconference session, the computer-executable instructions further cause the one or more processing units to cause the interactive timeline to be displayed in association with an end-of-session object embedded in a chat conversation or a calendar.

While Example Clauses O through R are described above with respect to a system, it is also understood in the context of this document that Example Clauses O through R can be implemented by a device, via instructions stored on computer-readable storage media, and/or as a method.

Example Clause S, a method comprising: causing content of a teleconference session to be displayed; causing an interactive timeline associated with the teleconference session to be displayed, wherein the interactive timeline is configured to present a plurality of representations of one or more different types; detecting, by one or more processing units, an occurrence of a notable event within a chat conversation associated with the teleconference session; adding a representation that corresponds to the notable event to the interactive timeline based at least in part on the detecting; receiving a request based on hover input associated with the representation on the interactive timeline while the content of the teleconference session continues to be displayed in association with a current view; and based at least in part on receiving the request, causing information to be displayed while the content of the teleconference session continues to be displayed in association with the current view, the information describing the notable event that corresponds to the representation.

Example Clause T, the method of Example Clause S, wherein the notable event comprises at least one of: a mention of a user; a file that is shared; an expression that is shared; or a link to an external object.

While Example Clauses S and T are described above with respect to a method, it is also understood in the context of this document that Example Clauses S and T can be implemented by a device, by a system, and/or via instructions stored on computer-readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:
1. A system comprising:
one or more processing units; and
a computer-readable medium having encoded thereon computer-executable instructions to cause the one or more processing units to:
cause content of a teleconference session to be displayed;
cause an interactive timeline associated with the teleconference session to be displayed, wherein the interactive timeline includes a plurality of representations that correspond to a plurality of notable events associated with the teleconference session and wherein the plurality of representations are of one or more different types;

receive a first request associated with a representation of the plurality of representations while the content of the teleconference session continues to be displayed in association with a current view;

based at least in part on receiving the first request, cause first information to be displayed while the content of the teleconference session continues to be displayed in association with the current view, the first information describing a notable event that corresponds to the representation;

receive a second request associated with the representation; and based at least in part on receiving the second request, switch from the current view to a different view to display second information associated with the notable event.

2. The system of claim 1, wherein the first request is associated with hovering of a user control element over the representation.

3. The system of claim 1, wherein the computer-executable instructions further cause the one or more processing units to cause the first information to be displayed in an overlay display area on top of the content of the teleconference session being displayed in association with the current view.

4. The system of claim 1, wherein the plurality of notable events are different types of notable events comprising at least two of:
   a mention of a user;
   a file that is shared;
   a comment that is submitted to a chat conversation;
   a task that is assigned;
   a poll that is conducted;
   an expression that is shared; or
   a link to an external object.

5. The system of claim 1, wherein the first information comprises one or more of:
   identification information associated with a user that is a source of the notable event;
   identification information associated with one or more users to which the notable event is directed;
   text of an individual comment that is submitted to a chat conversation;
   a name of a file that is shared;
   a general description of a task;
   an option to submit a vote for a poll; or
   a link to an external object.

6. The system of claim 5, wherein the second information provides more detail about the notable event than the first information, the second information comprising one or more of:
   a recorded portion of the teleconference session associated with a time on the interactive timeline with which the notable event is associated;
   a part of a chat conversation in which a comment is submitted;
   a display area of a recorded portion of the teleconference session associated with a time on the interactive timeline with which the notable event is associated;
   content of a file that is shared;
   details of a task that is assigned;
   results of a poll that is conducted; or
   information accessible via selection of a link to an external object.

7. The system of claim 1, wherein the computer-executable instructions further cause the one or more processing units to:
   cause an option that enables a user to add a notable event of a particular type to the interactive timeline to be displayed;
   receive a selection of the option; and
   add the notable event of the particular type to the interactive timeline based at least in part on the selection.

8. The system of claim 1, wherein the computer-executable instructions further cause the one or more processing units to graphically distinguish, using different colors, between a first notable event and a second notable event of the plurality of notable events based on a first user being a first source of the first notable event and a second user being a second source of the second notable event.

9. The system of claim 1, wherein the computer-executable instructions further cause the one or more processing units to:
   detect an occurrence of at least one of the plurality of notable events during the teleconference session; and
   add the at least one of the plurality of notable events to the interactive timeline based at least in part on the detecting.

10. The system of claim 9, wherein the at least one of the plurality of notable events occurs based on input into a chat conversation that is associated with the teleconference session.

11. The system of claim 1, wherein the content of the teleconference session comprises recorded content.

12. The system of claim 1, wherein the content of the teleconference session comprises live content.

13. The system of claim 1, wherein the different view comprises a first display area that includes the content of the teleconference session that corresponds to a position of an interactive timeline cursor and a second display area that includes the second information associated with the notable event.

14. The system of claim 1, wherein switching from the current view to the different view comprises replacing the content of the teleconference session that corresponds to a position of an interactive timeline cursor with the second information associated with the notable event.

15. A system comprising:
   one or more processing units; and
   a computer-readable medium having encoded thereon computer-executable instructions to cause the one or more processing units to:
   record live content of a teleconference session;
   determine occurrences of a first set of notable events that are associated with the live content of the teleconference session;
   add, to an interactive timeline associated with the teleconference session, a first set of representations that correspond to the first set of notable events;
   receive a request to view recorded content of the teleconference session;
   cause the recorded content of the teleconference session to be displayed;
   cause the interactive timeline associated with the teleconference session to be displayed;
   determine occurrences of a second set of notable events associated with the recorded content of the teleconference session; and
   add, to the interactive timeline associated with the teleconference session, a second set of representations that correspond to the second set of notable events, wherein the interactive timeline graphically distinguishes between the first set of representations and the second set of representations.

16. The system of claim 15, wherein the interactive timeline graphically distinguishes between the first set of representations and the second set of representations using colors.

17. The system of claim 15, wherein the interactive timeline graphically distinguishes between the first set of representations and the second set of representations using display locations.

18. The system of claim 15, wherein, prior to receiving the request to view the recorded content of the teleconference session, the computer-executable instructions further cause the one or more processing units to cause the interactive timeline to be displayed in association with an end-of-session object embedded in a chat conversation or a calendar.

19. A method comprising:
   causing content of a teleconference session to be displayed;
   causing an interactive timeline associated with the teleconference session to be displayed, wherein the interactive timeline is configured to present a plurality of representations of one or more different types;
   detecting, by one or more processing units, an occurrence of a notable event within a chat conversation associated with the teleconference session;
   adding a representation that corresponds to the notable event to the interactive timeline based at least in part on the detecting;
   receiving a request based on hover input associated with the representation on the interactive timeline while the content of the teleconference session continues to be displayed in association with a current view; and
   based at least in part on receiving the request, causing information to be displayed while the content of the teleconference session continues to be displayed in association with the current view, the information describing the notable event that corresponds to the representation.

20. The method of claim 19, wherein the notable event comprises at least one of:
   a mention of a user;
   a file that is shared;
   an expression that is shared; or
   a link to an external object.

* * * * *